(12) United States Patent
Zhang

(10) Patent No.: US 6,891,576 B2
(45) Date of Patent: May 10, 2005

(54) METHOD FOR MANUFACTURING LIQUID CRYSTAL PANEL, LIQUID CRYSTAL PANEL AND MANUFACTURING SYSTEM OF THE SAME

(75) Inventor: Hongyung Zhang, Kanagawa (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 106 days.

(21) Appl. No.: 10/385,050

(22) Filed: Mar. 10, 2003

(65) Prior Publication Data

US 2003/0231277 A1 Dec. 18, 2003

Related U.S. Application Data

(62) Division of application No. 09/490,502, filed on Jan. 25, 2000.

(30) Foreign Application Priority Data

Mar. 17, 1999 (JP) ............................................ 11-072272

(51) Int. Cl.[7] ........................................... G02F 1/1368
(52) U.S. Cl. ......................................... 349/1; 349/187
(58) Field of Search ............................. 349/1, 42, 43, 349/73, 158, 187; 445/24, 25, 60, 65, 66; 438/30; 118/35, 40, 719; 414/935, 937, 939

(56) References Cited

U.S. PATENT DOCUMENTS

| | | | |
|---|---|---|---|
| 5,464,490 A | 11/1995 | Sato et al. | 156/145 |
| 5,831,694 A | 11/1998 | Onisawa et al. | 349/43 |
| 6,144,082 A | 11/2000 | Yamazaki et al. | 257/412 |
| 6,195,149 B1 | 2/2001 | Kodera et al. | 187/349 |
| 6,524,977 B1 | 2/2003 | Yamazaki et al. | 438/799 |

FOREIGN PATENT DOCUMENTS

JP 9-325328 12/1997

*Primary Examiner*—Toan Ton
*Assistant Examiner*—Tai Duong
(74) *Attorney, Agent, or Firm*—Greer, Burns & Crain, Ltd.

(57) ABSTRACT

A substrate is plotted into a plurality of blocks, and each block is plotted into one or a plurality of device-forming regions. By using a first manufacturing line, a conductive film, an insulating film and a semiconductor film which constitute TFT are formed in the device-forming region. Then, primary cutting is performed to cut the substrate into the respective blocks and form a plurality of sub-TFT substrates. Then, by using a second manufacturing line, processing is performed for each sub-TFT substrate in accordance with specifications of a liquid crystal panel to be manufactured. Then, secondary cutting is performed to cut the sub-TFT substrate into respective device-forming regions.

1 Claim, 36 Drawing Sheets

FIG. 2
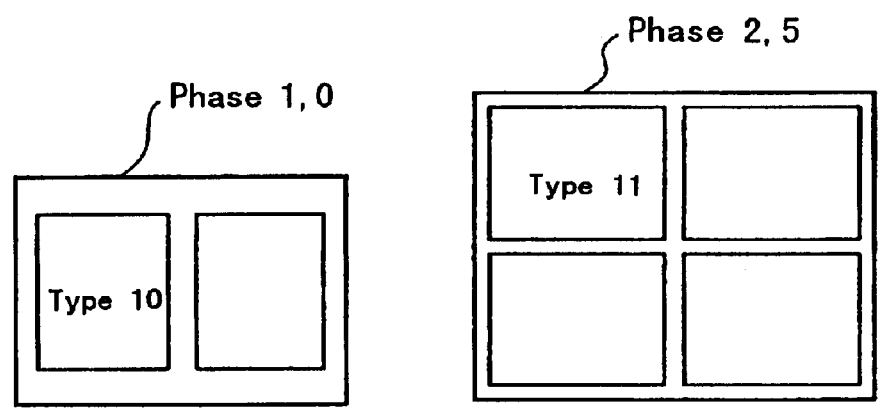
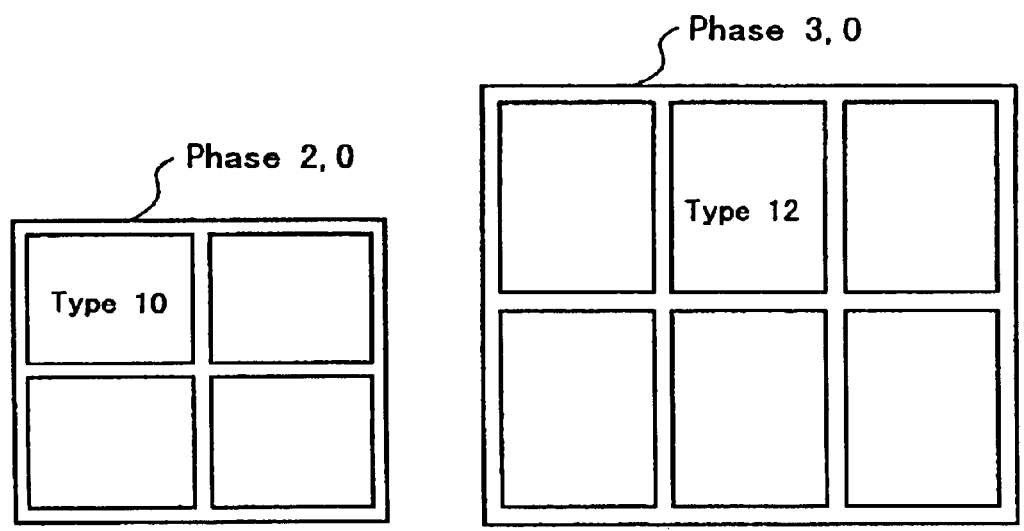

FIG. 3
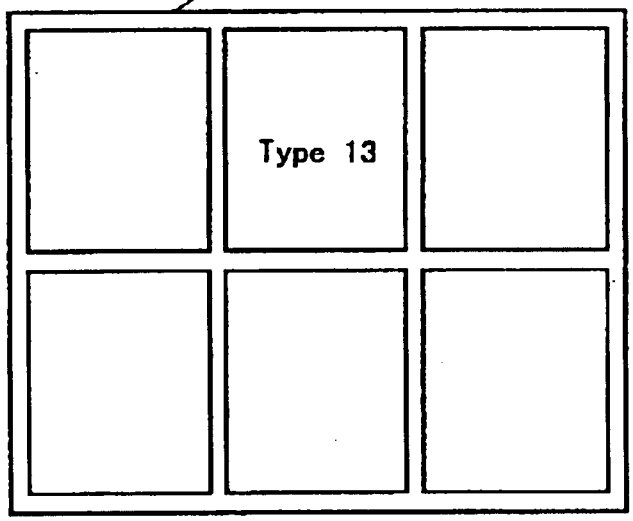
Phase 3, 5 — Type 13
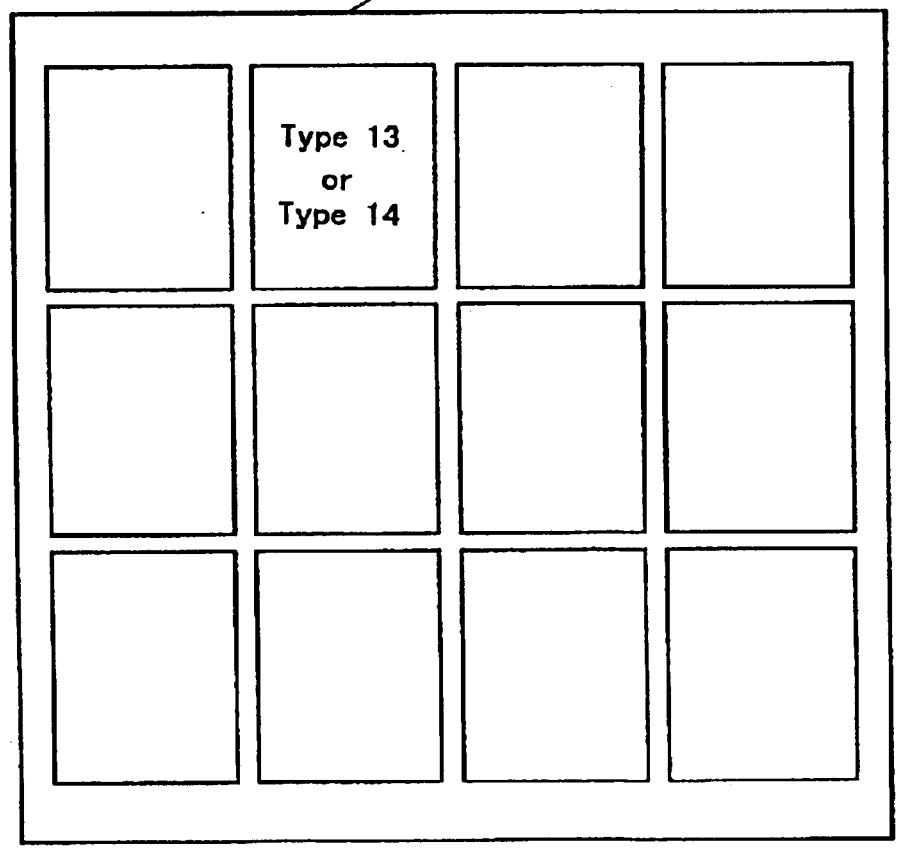
Fourth Line — Type 13 or Type 14

FIG. 4
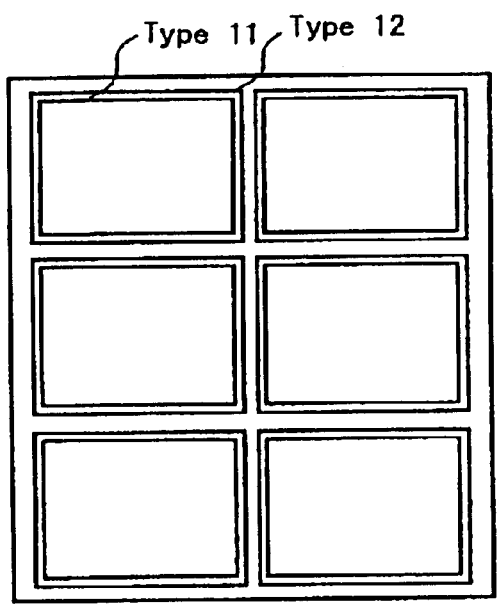
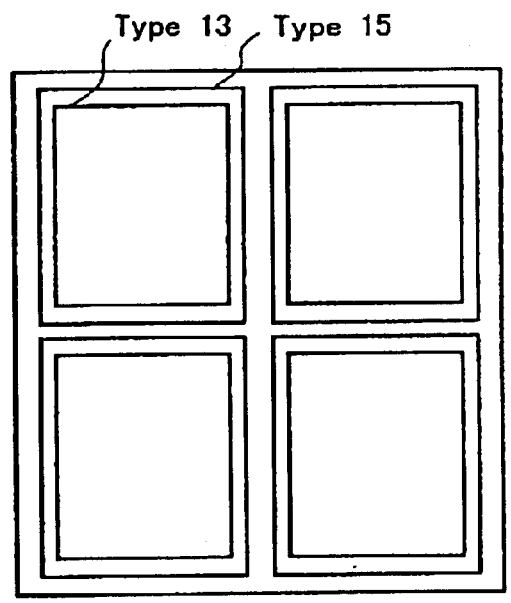
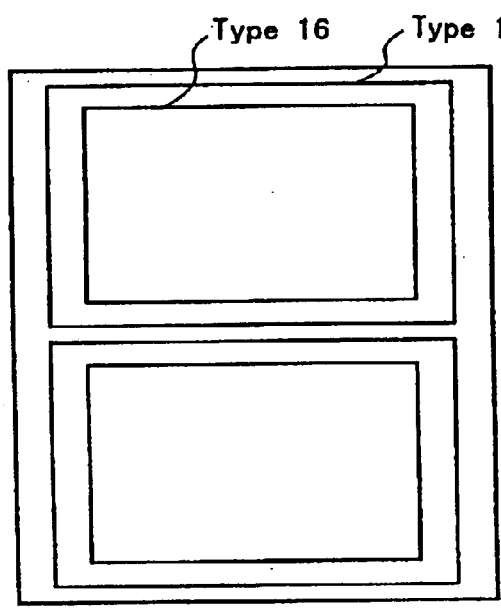
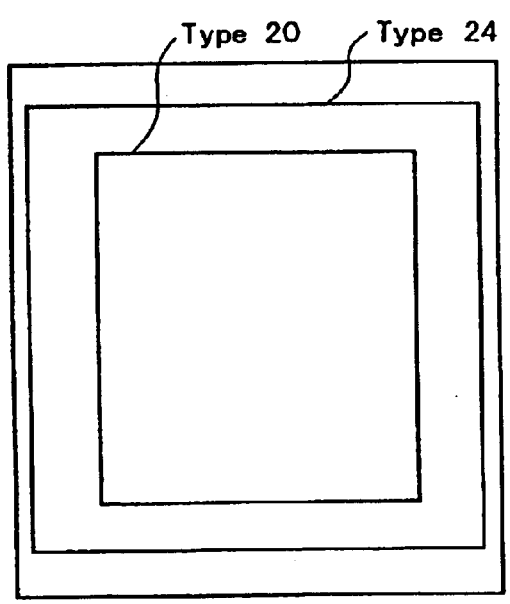

METHOD FOR MANUFACTURING LIQUID CRYSTAL PANEL, LIQUID CRYSTAL PANEL AND MANUFACTURING SYSTEM OF THE SAME

This is a divisional of application Ser. No. 09/490,502, filed Jan. 25, 2000.

BACKGROUND OF THE INVENTION

1. Field of the Invention

The present invention relates to a liquid crystal panel manufacturing method for manufacturing a plurality of liquid crystal panels by using one master glass substrate, a liquid crystal panel manufactured by the manufacturing method and a manufacturing system of the same.

2. Description of the Related Art

A display using a liquid crystal panel of an active matrix system prevents crosstalk by providing a switch for each pixel (picture element), the switch being turned OFF at the time of unselection to cut off a signal. Compared with a display using a liquid crystal panel of a simple matrix system, this display shows a better display characteristic. Especially, a liquid crystal display using TFT (Thin Film Transistor) as a switch shows a display characteristic as excellent as that of CRT (Cathode-Ray Tube), because of high driving performance of TFT.

Generally, the liquid crystal panel has a structure where a liquid crystal is enclosed between two transparent substrates. A counter electrode, a color filter, an orientation film, and so on, are formed on one of two opposing surfaces of the transparent substrates. TFT, a pixel electrode, an orientation film, and so on, are formed on the other surface. Also, polarizing plates are stuck to surfaces opposite the opposing surfaces of the respective transparent substrates. These two polarizing plates are arranged, for example, so that polarization axes of the polarizing plates can be orthogonal to each other. In this arrangement, a light is transmitted in a state of no electric field application. In a state of electric field application, a light shielding mode, i.e., a normally white mode, is set. Conversely, when the polarization axes of the two polarizing plates are in parallel with each other, a normally black mode is set. Hereinafter, a transparent substrate having TFT and a pixel electrode, or a transparent substrate having TFT and a pixel electrode formed therefrom, is referred to as TFT substrate. A transparent substrate having a counter electrode and a color filter is referred to as CF substrate.

Recent years have seen a gradual increase in size of the liquid crystal panel of an active matrix type, which is used in a notebook personal computer (referred to as "PC", hereinafter), and a desktop PC, a work station or the like.

In manufacturing of a liquid crystal panel, generally, a large substrate called master glass is used. The master glass substrate is plotted into a plurality of liquid crystal panel forming regions. TFT, a pixel electrode, and so on, are formed in each region, and then a spacer is dispersed on the master glass substrate (TFT substrate). The master glass substrate and a CF substrate are joined with the spacer between. Subsequently, the master glass substrate is divided to form individual liquid crystal panels. With enlargement of the liquid crystal panel, a size of the master glass substrate has a tendency to be increased year by year. Also, in order to reduce manufacturing costs, the number of liquid crystal panels manufactured by using one master glass substrate (the number of yielded pieces) has been increased.

Table 1 below shows correspondence between a manufacturing line generation of a liquid crystal panel of an active matrix system and a size of a master glass substrate. FIG. 1 shows comparison in size among master glass substrates of respective generations.

TABLE 1

| Line generation | Substrate size | Type 10 | Type 11 | Type 12 | Type 13 | Type 15 |
| --- | --- | --- | --- | --- | --- | --- |
| Phase 1 | 300 × 400 mm | 2 pieces yielded | 2 pieces yielded | 1 piece yielded | 1 piece yielded | 1 piece yielded |
| Phase 2 | 360 × 465 mm | 4 pieces yielded | 2 pieces yielded | 2 pieces yielded | 2 pieces yielded | 1 piece yielded |
| Phase 2.5 | 400 × 500 mm | | 4 pieces yielded | 2 pieces yielded | 2 pieces yielded | 2 pieces yielded |
| Phase 3 | 550 × 650 mm | | | 6 pieces yielded | 4 pieces yielded | 4 pieces yielded |
| Phase 3.5 | 600 × 720 mm | | | | 6 pieces yielded | 4 pieces yielded |
| Phase 4 | 960 × 1000 mm | | | | 12 pieces yielded | 9 pieces yielded |

As shown in Table 1, in the manufacturing line of phase 1, a size of the master glass substrate is 300×400 mm, and two liquid crystal panels of type 10 (length of a diagonal is 10.4 inch) or type 11 (length of a diagonal is 11.4 inch) can be simultaneously formed. On the other hand, in the manufacturing line of phase 4 currently under studies by makers, the master glass substrate has a size of 960×1000 mm, and an area 8 times as large as that of the master glass substrate of phase 1. With the master glass substrate of phase 4, twelve liquid crystal panels of type 13 (length of a diagonal is 13.3 inch) or type 14 (length of a diagonal is 14.1 inch) can be simultaneously manufactured.

Recent years have also seen diversification of demands for liquid crystal panels. At first, the liquid crystal panel was mainly used as a display for a notebook PC. Then, there has been expansion year by year regarding markets for a large liquid crystal panel used as a display for a desktop PC or a work station, a medium or a small liquid crystal panel used for a mobile equipment such as a mobile communication equipment or a portable information equipment, and a liquid crystal panel used for a video equipment such as television (TV), video (VTR), a digital camera or the like.

Conventionally, the manufacturing line of a liquid crystal panel has been constructed basically for the purpose of providing a liquid crystal panel having a specified dimension. For example, as shown in FIGS. 2 and 3, in the manufacturing line of phase 1, a size of a master glass substrate is decided with a view to yielding two pieces for the liquid crystal panel of type 10. The manufacturing line is constructed in accordance with this master glass substrate. The following manufacturing lines are similarly constructed: the manufacturing line of phase 2 for yielding four pieces of the liquid crystal panel of type 10; the manufacturing line of phase 2.5 for yielding four pieces of the liquid crystal panel of type 10 or 11; the manufacturing line of phase 3 for yielding four pieces of the liquid crystal panel of type 12 (length of a diagonal is 12.1 inch); and the manufacturing line of phase 3.5 for yielding six pieces of the liquid crystal panel of type 13. Also, the manufacturing line of phase 4 is constructed with a view to yielding twelve pieces of the liquid crystal panel of type 13 or 14, or yielding four to six pieces of the liquid crystal panel of type 15 or bigger.

The inventors of this application consider that the following three problems are inherent in the conventional manufacturing method of the liquid crystal panel.

The first problem is great fluctuation in productivity caused by a dimension of the liquid crystal panel. FIG. 4 shows a relationship between a panel size of the manufacturing line of phase 3 (size of the master glass substrate is 550×650 mm) and the number of yielded pieces. In the manufacturing line of phase 3, six pieces of the liquid crystal panel of type 11 or 12 are yielded; four pieces of the liquid crystal panels of types 13 to 15 are yielded; two pieces of the liquid crystal panels of types 16 to 19 are yielded; and one piece of the liquid crystal panel of types 20 to 24 is yielded.

Table 2 below shows dependence of an effective substrate utilization factor reflecting productivity on the number of panel pieces yielded and a panel dimension.

TABLE 2

| Panel dimension (type) (or diagonal inch) | Number of yielded pieces | Effective substrate utilization factor |
|---|---|---|
| Type 12 | 6 pieces yielded | 0.86 |
| Type 13 | 4 pieces yielded | 0.67 |
| Type 15 | 4 pieces yielded | 0.87 |
| Type 16 | 2 pieces yielded | 0.51 |
| Type 19 | 2 pieces yielded | 0.72 |
| Type 20 | 1 piece yielded | 0.40 |
| Type 24 | 1 piece yielded | 0.57 |

Herein, an area of the master glass substrate excluding a handling region of an edge part is set as a substrate effective area, and an area of a display region of the liquid crystal panel is set as a panel area. Then, effective utilization area=panel area×number of yielded pieces, and effective substrate utilization factor=effective utilization area/substrate effective area are defined.

As can be understood from Table 2, even if panel sizes are changed from type 16 to type 19, the number of liquid crystal panels to be simultaneously manufactured is still two. Accordingly, an effective substrate utilization factor fluctuates in a range of 0.51 to 0.72. In other words, in a given manufacturing line, there is a panel size having a maximum effective substrate utilization factor with the fixed number of yielded pieces. For example, in the case of the manufacturing line of phase 3, a panel size having a maximum effective substrate utilization factor is type 12 with the number of yielded pieces set to 6; type 15 with the number of yielded pieces set to 4; type 19 with the number of yielded pieces set to 2; and type 24 with the number of yielded pieces set to 1. Among these, a highest effective substrate utilization factor is 0.86 of type 12 with the number of yielded pieces set to 6, and a lowest effective substrate utilization factor is 0.4 of type 20 with the number of yielded pieces set to 1. This means that the conventional method exhibits fluctuation twice as large or more, because an effective substrate utilization factor fluctuates in a range of 0.4 to 0.87 depending on the sizes of liquid crystal panels to be manufactured.

The second problem is inability to deal with diversification of products, which is caused by enormous investments made in the manufacturing line for liquid crystal panels. Recent years have seen gradually expanded use of liquid crystal panels for a display of a notebook (including sub-notebook) PC, a desktop PC or a work station, a display of a mobile equipment, a video equipment, and so on. Conventionally, however, a basic idea has been the following: ① a liquid crystal panel having a specified size is manufactured in a specified manufacturing line; and ② a specified variety is fed at a specified lot. Accordingly, in order to deal with diversified liquid crystal panels, a plurality of manufacturing lines must be constructed according to sizes and varieties of liquid crystal panels. Conventionally, manufacturing lines have been constructed to match liquid crystal panels to be manufactured, for example in a manner that a liquid crystal panel is manufactured for a notebook PC in a first manufacturing line, a liquid crystal panel is manufactured for a mobile equipment and a video equipment in a second manufacturing line, and a liquid crystal panel is manufactured for a monitor in a third manufacturing line.

It was relatively easy to construct manufacturing lines according to sizes or varieties of liquid crystal panels when there were not many kinds of products. From now on, however, with a great increase in size of a master glass substrate and diversification of products, construction of a manufacturing line for each product will bring about an enormous increase in plant and equipment investments. Thus, it will be difficult to deal with diversified products.

The third problem of the conventional method is inability to deal with changes in market demands. For example, around 1994, each maker of a liquid crystal panel predicted that a size of a liquid crystal panel for a notebook PC would be type 10, and accordingly constructed a manufacturing line of phase 2 with a view to yielding four pieces of the liquid crystal panel of type 10. Less than a year, however, a mainstream size of the liquid crystal panel for a notebook PC changed to type 11. As a result, almost no manufacturing lines which had been constructed had capability of dealing with the new need, the line was changed to type 11 with the number of yielded pieces set to 2. Thus, productivity was reduced by half.

In the next year, 1995, since a mainstream size of the liquid crystal panel changed to type 12, a specially constructed manufacturing line of phase 2.5 became one for manufacturing a liquid crystal panel of type 12 with the number of yielded pieces set to 2. Also, in this case, productivity was reduced by half.

SUMMARY OF THE INVENTION

The present invention was made with the foregoing problems in mind, and it is an object of the invention to provide a method for manufacturing a liquid crystal panel. This method is capable of efficiently using conventional facilities even if a size of a master glass substrate is changed, easily meeting diversified market demands, and reducing manufacturing costs. It is another object of the invention to provide a liquid crystal panel manufactured by the above method. It is yet another object of the invention to provide a manufacturing system of a liquid crystal panel.

As shown in FIG. 5, the foregoing object is achieved by a method for manufacturing a liquid crystal panel of an active matrix system. This method is characterized in comprising the steps of: performing arraying for plotting a master glass substrate 10 into a plurality of blocks 11a to 11d, further plotting the blocks 11a to 11d into a plurality of device-forming regions 12a to 12d, and forming a conductive film, an insulating film and a semiconductor film which constitute TFT in the device-forming regions 12a to 12d; performing primary cutting to cut the master glass substrate into the blocks 11a to 11d so as to form a plurality of sub-TFT substrates; performing sub-TFT substrate processing for executing processing for each sub-TFT substrate in accordance with a device to be manufactured; and performing secondary cutting to cut the sub-TFT substrate for the respective device-forming regions 12a to 12d.

Generally, the manufacturing process of the liquid crystal panel of an active matrix system is carried out in the order of the following steps: arraying for forming TFT on the master glass substrate; sub-TFT substrate processing for forming the pixel electrode and the orientation film and then joining the substrate to CF substrate; and cutting for cutting the master glass substrate. In the manufacturing process of the liquid crystal panel, the contents of the arraying step are basically the same even if different varieties are processed. In other words, in the arraying step, even if varieties of liquid crystal panels are different, the order of forming the insulating film, the semiconductor film and the conductive film, a thickness of each film and materials are almost the same. On the other hand, a material for the orientation film, a cell gap and a liquid crystal material formed in the sub-TFT substrate processing step are different from variety to variety.

Thus, with the present invention, the master glass substrate is plotted into a plurality of blocks, and each block is further plotted into one or a plurality of device-forming regions. Then, the conductive film, the insulating film and the semiconductor film which constitute TFT are formed in at least one device-forming region by executing TFT formation process in the state of the master glass substrate. In this way, with the invention, processing of the common process is carried out in the state of the master glass substrate irrespective of the kind of the liquid crystal panel. At this time, the process uses the first manufacturing line including a large film-forming equipment, an exposure device, a developer equipment, an etching equipment, and so on, which are all capable of performing operations in the state of the master glass substrate.

Then, in the step of primary cutting, the master glass substrate is cut into the sub-TFT substrates of the respective blocks. For each sub-TFT substrate, processing is performed in accordance with a device to be manufactured. In other words, an orientation film is formed by using a material according to the variety of the liquid crystal panel, or a cell gap is adjusted. In this case, since processing is carried out in the state of the sub-TFT substrate smaller than the master glass substrate, the second manufacturing line including a film-forming equipment, an aligner, a developer equipment, an etching equipment, and so on, can be used, these elements being smaller than those of the first manufacturing line. In other words, a manufacturing line of a generation before the first manufacturing line can be used. Then, in the step of secondary cutting, the sub-TFT substrate is cut to have a specified panel size, and a liquid crystal is injected into the panel in accordance with specifications of the liquid crystal panel.

According to the present invention, since the master glass substrate is divided into a plurality of sub-TFT substrates in the step of primary cutting and then the sub-TFT substrate processing is performed, the facilities of a previous generation can be efficiently used. Accordingly, plant and equipment investments can be reduced. Also, by properly selecting combination of liquid crystal panels manufactured by using one master glass substrate, an effective substrate utilization factor can be increased, and dealing with changes in market demands can be facilitated.

In the present invention, for example, a liquid crystal panel having an identical size may only be formed in one block. Also, to increase an effective utilization factor, two or more kinds of liquid crystal panels different from one another in size may be formed in one block. Further, a direct vision type liquid crystal panel may be formed in a given block, and projection liquid crystal panels may be formed in the other blocks. Furthermore, a liquid crystal panel of a transmission type may be formed in a given block, and projection panels of reflection types may be formed in the other blocks.

With the present invention, since TFT is formed in the state of the master glass substrate, the arraying step includes a step of forming a semiconductor film. Furthermore, in the step of sub-TFT substrate processing, however, a semiconductor film may be formed on the sub-TFT substrate. For example, for forming a liquid crystal panel incorporating a photoelectric conversion element such as an optical communication light sensor, an image sensor of a one-dimensional non-adhesion type, an image sensor of a two-dimensional non-adhesion type, an image sensor of a one-dimensional adhesive type, an image sensor of a two-dimensional adhesive type or the like, a silicon film in the light sensor or the image sensor must be formed to be relatively thick. Film-forming efficiency is higher in simultaneous formation of silicon films on the plurality of sub-TFT substrates by using a batch film-forming equipment after division into the sub-TFT substrate than for thick formation of a silicon film by using a (sheet-fed) film forming equipment in the state of the master glass substrate. Accordingly, for forming a liquid crystal panel incorporating an optical communication light sensor or an image sensor, preferably, the sub-TFT substrate processing step should include a step of forming a semiconductor film.

Japanese Patent Laid-Open Hei. 9 (1997)-325328 disclosed a technology of forming liquid crystal panels different from one another in size in a master glass substrate, and then cutting the master glass substrate to match the individual liquid crystal panels. According to the technology disclosed in Japanese Patent Laid-Open Hei. 9 (1997)-325328, however, a plurality of liquid crystal panels are simultaneously formed by using one master glass substrate and, immediately before the step of injecting a liquid crystal, the master glass substrate is cut and separated into the individual liquid crystal panels. Consequently, the number of steps of cutting the substrate is only one, and a large manufacturing line is necessary for processing the master glass substrate until separation into the individual liquid crystal panels. For this reason, with the technology disclosed in Japanese Patent Laid-Open Hei. 9 (1997)-325328, utilization efficiency of the master glass substrate can be increased, but the manufacturing line of a previous generation cannot be used. Thus, the technology is not a satisfactory solution for efficient use of facilities. Also, with the technology disclosed in Japanese Patent Laid-Open Hei 9 (1997)-325328, only liquid crystal panels having the same orientation film materials and the same cell gaps can be simultaneously formed. Liquid crystal panels having different orientation film materials and different cell gaps cannot be manufactured by using one master glass substrate.

On the other hand, according to the present invention, although the steps performed in the state of the master glass substrate are common among the liquid crystal panels, steps intrinsic to each liquid crystal panel can be performed in the step of sub-TFT substrate processing after cutting the master glass substrate into the sub-TFT substrates. Therefore, liquid crystal panels having structures different from one another can be efficiently manufactured by using one master glass substrate.

BRIEF DESCRIPTION OF THE DRAWINGS

FIG. 2 is a plan view (1) showing a panel size and the number of yielded pieces in each generation.

FIG. 3 is a plan view (2) showing a panel size and the number of yielded pieces in each generation.

FIG. 4 is a plan view showing a relationship between a panel size and the number of yielded pieces in a manufacturing line of phase 3.

DESCRIPTION OF THE PREFERRED EMBODIMENTS

Hereinafter, description will be made of the preferred embodiments of the present invention with reference to the attached drawings.

First Embodiment

Figure 1:
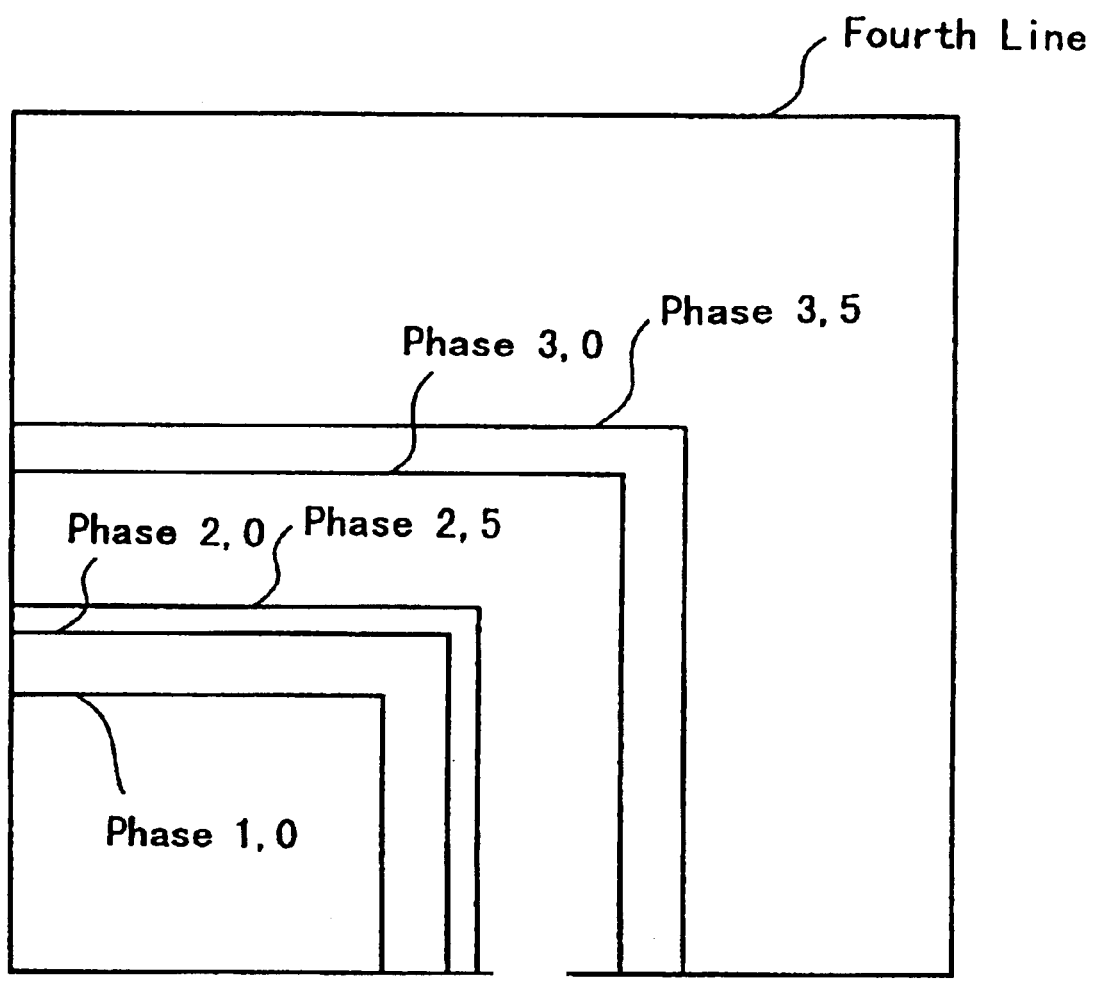
FIG. 1 is a plan view showing comparison in size among master glass substrates of respective generations.
Figure 5:
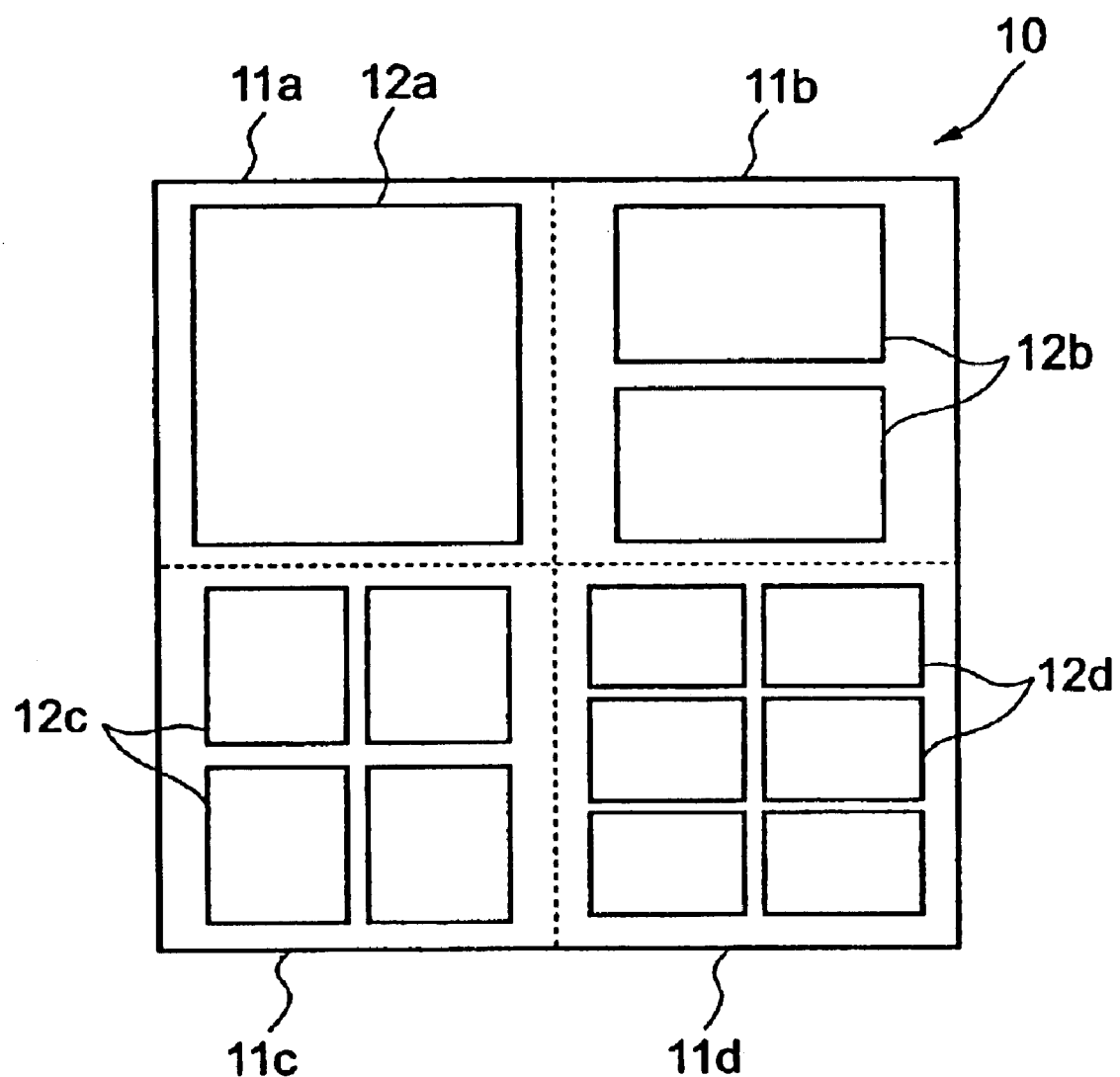
FIG. 5 is a plan view showing in outline a method for manufacturing a liquid crystal panel according to a first embodiment of the present invention.
Figure 6:
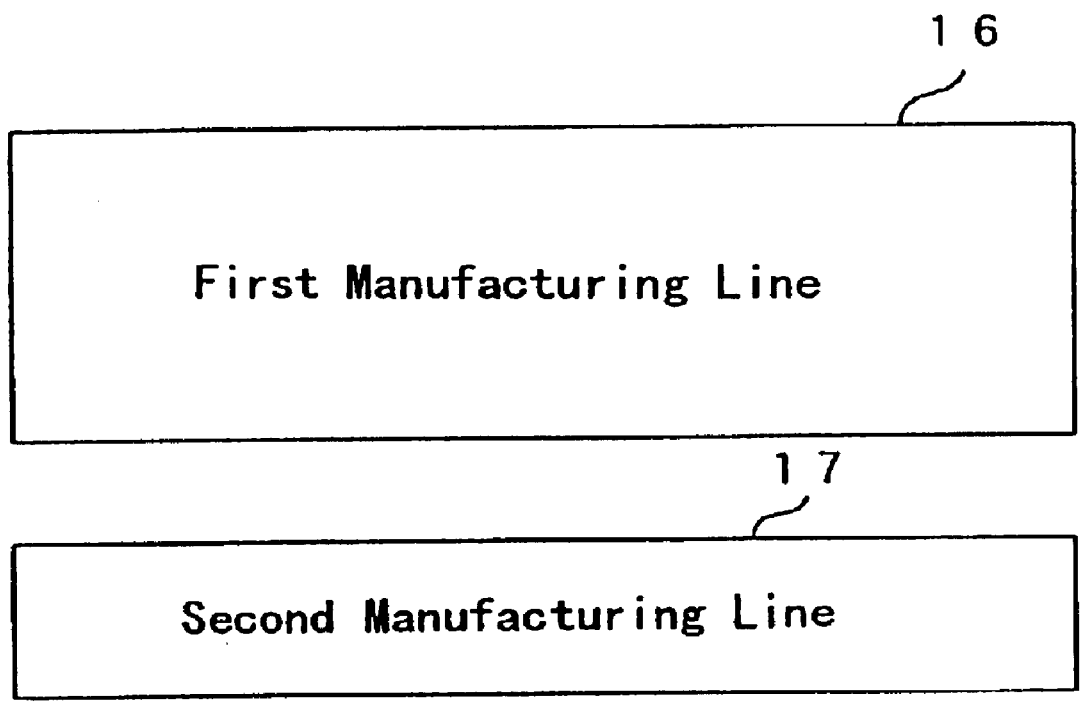
FIG. 6 is a schematic view showing a manufacturing system of a liquid crystal panel according to the present invention.
Figure 7A:
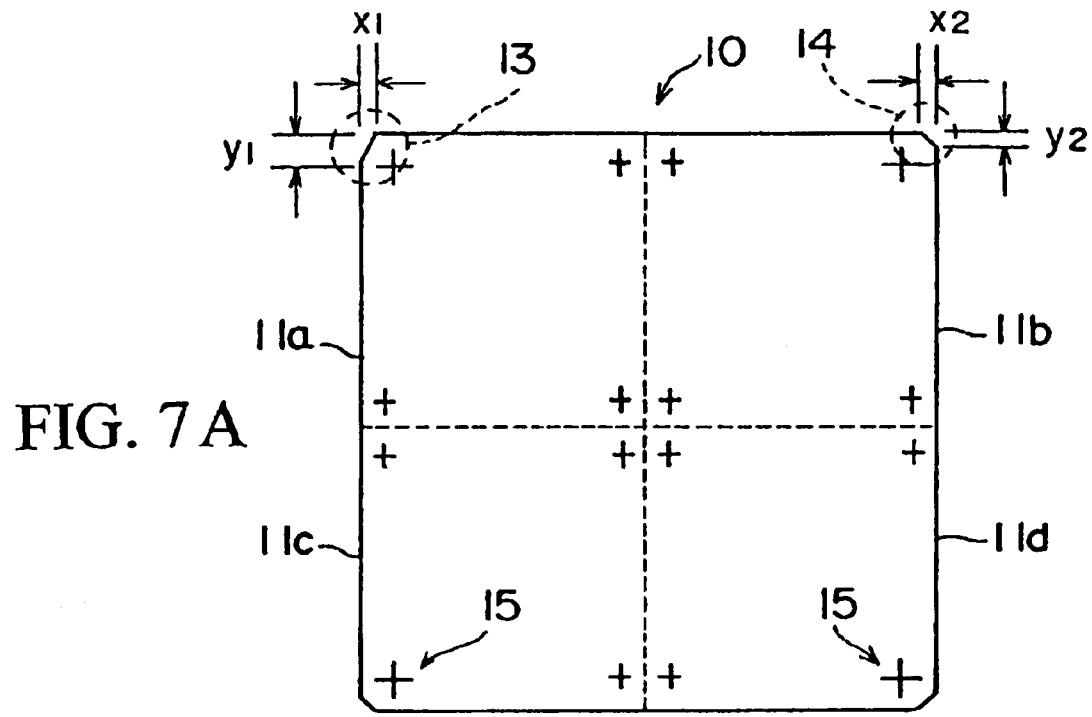
FIG. 7A is a plan view showing a master glass substrate.
Figure 7B:
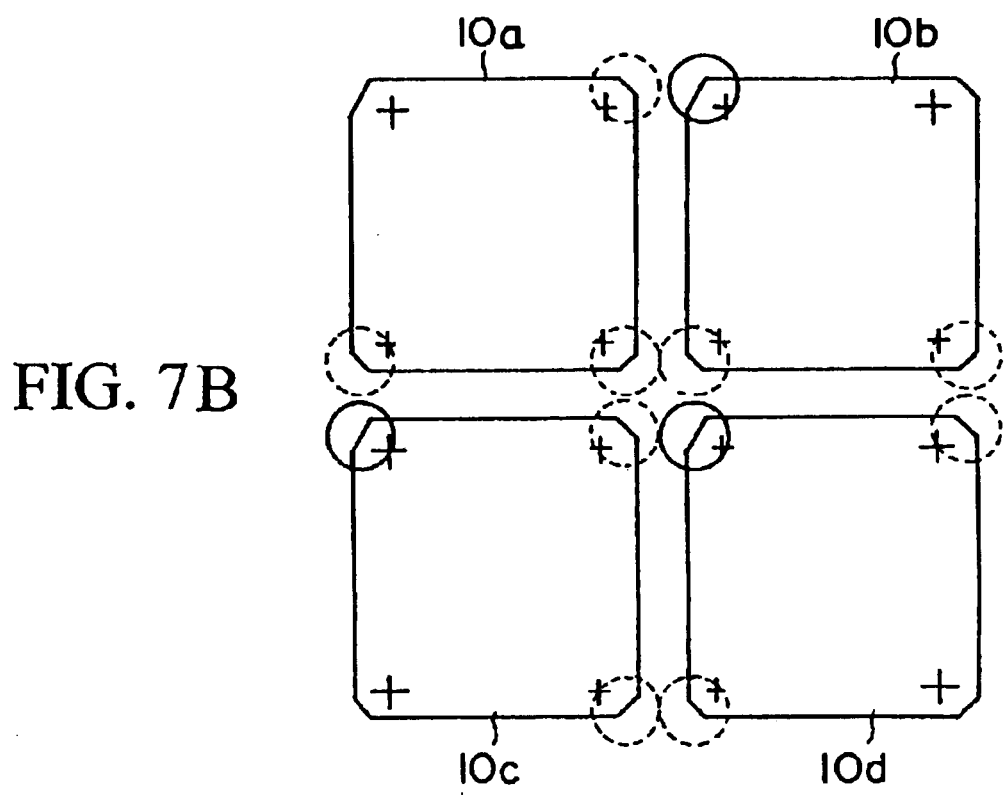
FIG. 7B is a plan view showing a sub-TFT substrate.

FIG. 5 is a plan view showing in outline a method for manufacturing a liquid crystal panel according to a first embodiment of the present invention; FIG. 6 is a schematic view showing a manufacturing system of a liquid crystal panel; and FIGS. 7A and 7B are plan views respectively showing a master glass substrate and a sub-TFT substrate.

In the first embodiment, a master glass substrate having a size of 960×1000 mm is used. And as shown in FIG. 5, the master glass substrate 10 is plotted into four blocks 11a to 11d. Then, for example, the following regions are secured in the respective blocks: in the first block 11a, one device-forming region 12a for forming a liquid crystal panel of type 20; in the second block 11b, two device-forming regions 12b for forming liquid crystal panels of types 12 to 15; in the third block 11c, four device-forming regions 12c for forming liquid crystal panels of types 10 and 11; and in the fourth block 11d, numerous (six in the drawing) device-forming regions 12d for forming liquid crystal panels for portable telephone sets of types 2 and 3. Because of a necessity of handling each sub-TFT substrate in a later-described sub-TFT substrate processing process, a handling area having a width of 10 to 15 mm must be secured in an edge of each of the blocks 11a to 11d.

In the embodiment, as shown in FIG. 6, two kinds of manufacturing lines, first and second manufacturing lines 16 and 17, are used. The first manufacturing line 16 is composed of a group of devices including a large cleaning equipment for treating the master glass substrate 10 having a size of 960×1000 mm, a film-forming equipment, an aligner, a developer equipment, an etching equipment, and so on. By using this first manufacturing line 16, a silicon film, an insulating film and a conductive film which constitute TFT are formed in each of the blocks 11a to 11d of the master glass substrate 10. Then, in primary cutting step, the master glass substrate 10 is cut in positions indicated by broken lines shown in FIG. 5 and FIG. 7A, and then divided into sub-TFT substrates 10a to 10d for the respective blocks 11a to 11d as shown in FIG. 7B. A size of each of the sub-TFT substrates 10a to 10d is set equal to 480×500 mm. The first manufacturing line 16 includes a film-forming equipment, for instance PECVD (Plasma Enhanced Chemical Vapor Deposition) device, for forming a semiconductor film serving as an active layer of TFT.

The second manufacturing line 17 shown in FIG. 6 is composed of a group of relatively small devices including a cleaning equipment, a film-forming equipment, an aligner, a developer equipment, an etching equipment, and so on, for treating the sub-TFT substrates 10a to 10d having sizes of 480×500 mm. In other words, for the second manufacturing line 17, a manufacturing line of a generation before the first manufacturing line 16 can be used. In this second manufacturing line 17, processing is executed to the sub-TFT substrates 10a to 10d according to respective liquid crystal panels manufactured. The second manufacturing line 17 includes a film-forming equipment made of ITO (indium-tin oxide), for forming a pixel electrode, for instance a sputtering equipment.

Figure 8:
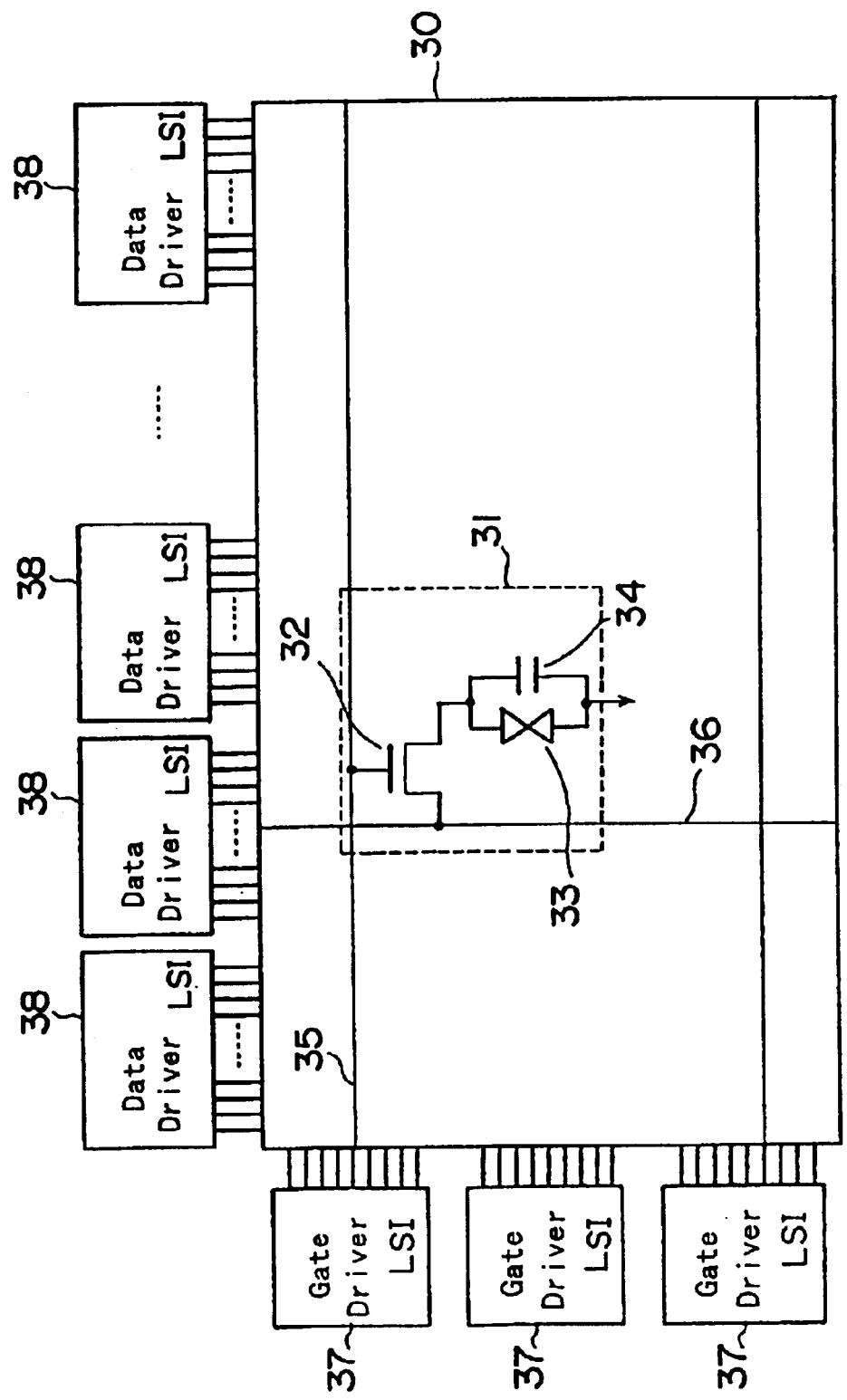
FIG. 8 is a schematic view showing a liquid crystal panel manufactured by the manufacturing method of a liquid crystal panel according to the first embodiment.

FIG. 8 is a schematic view showing a liquid crystal panel manufactured by the manufacturing method of a liquid crystal panel according to the first embodiment. As shown in FIG. 8, a liquid crystal panel 30 includes a plurality of pixels 31 (one is only shown in the drawing) arranged in a matrix form, and a scanning line 35 and a data line 36 passed among the pixels 31. Each pixel 31 is composed of a pixel electrode, a counter electrode, a transmitted light quantity control unit 33 made of a liquid crystal between these electrodes, TFT 32 and an auxiliary capacitive element 34.

A gate driver LSI (Large Scale Integrated Circuit) 37 and a data driver LSI 38 are connected to the liquid crystal panel 30. A scanning signal is supplied from the gate driver LSI 37 to the scanning line 35 by a specified timing. Display data is supplied from the data driver LSI 38 to the data line 36 by a specified timing.

Figure 9:
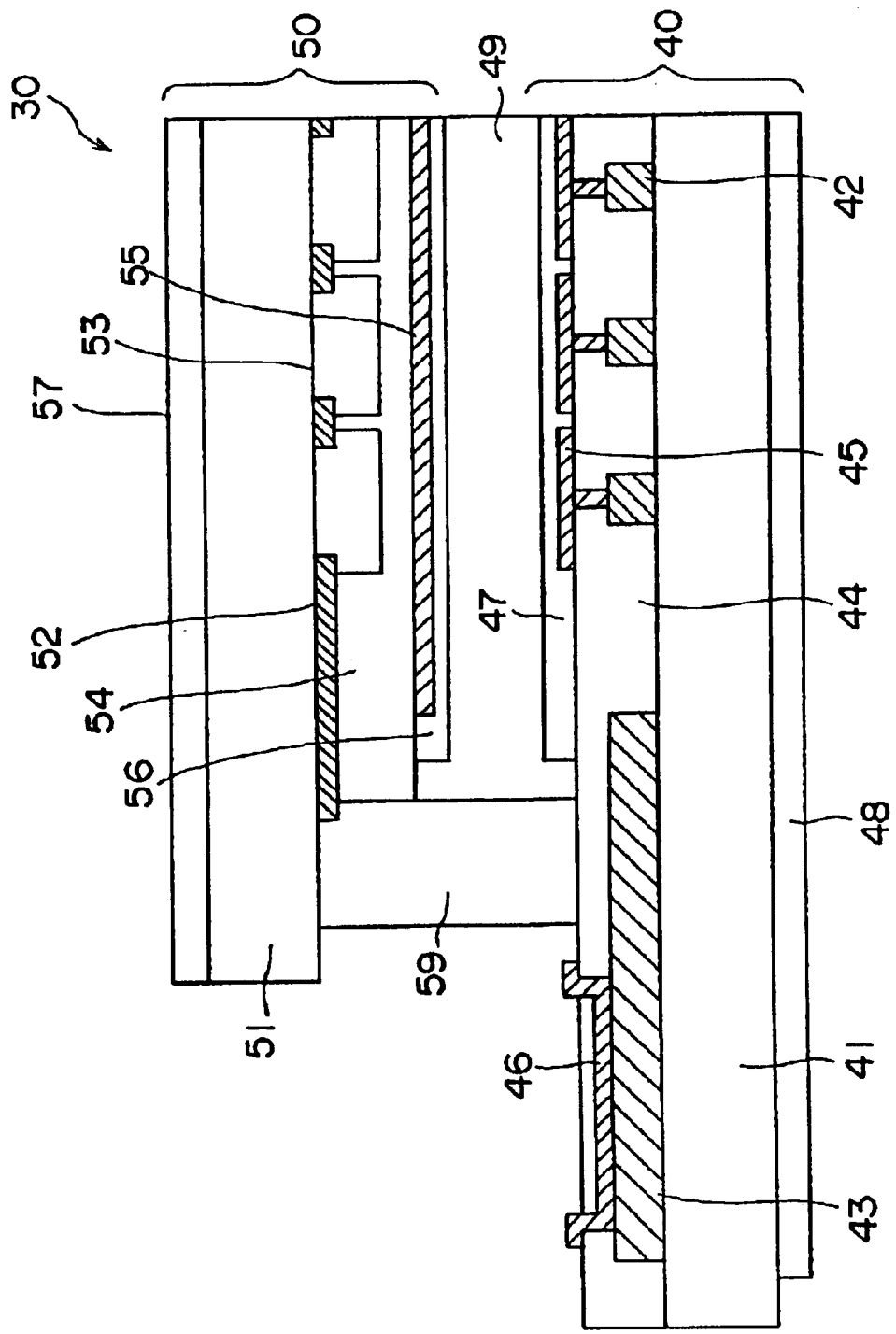
FIG. 9 is a sectional view showing the liquid crystal panel manufactured by the manufacturing method of a liquid crystal panel according to the first embodiment.

FIG. 9 is a sectional view showing a direct-vision liquid crystal panel 30 manufactured according to the first embodiment. The liquid crystal panel 30 includes TFT substrate 40 and CF substrate 50 arranged to sandwich a spacer (not shown), a sealing material 50 for joining TFT substrate 40 and CF substrate 50 with each other, and a liquid crystal 49 sealed between TFT substrate 40 and CF substrate 50. Polarizing plates 48 and 57 are respectively arranged in the lower side of TFT substrate 40 and in the upper side of CF substrate 50.

TFT substrate 40 is composed of a glass substrate 41, TFT 42 formed thereon, a wiring 43 such as data line and a scanning line, an interlayer insulating film 44, a pixel electrode 45, a drawer terminal 46 and an orientation film 47. Also, CF substrate 50 is composed of a glass substrate 51, a black matrix 52 formed below the same, a color filter 53, an interlayer insulating film 54, a counter electrode 55 and an orientation film 56.

Figure 10A:
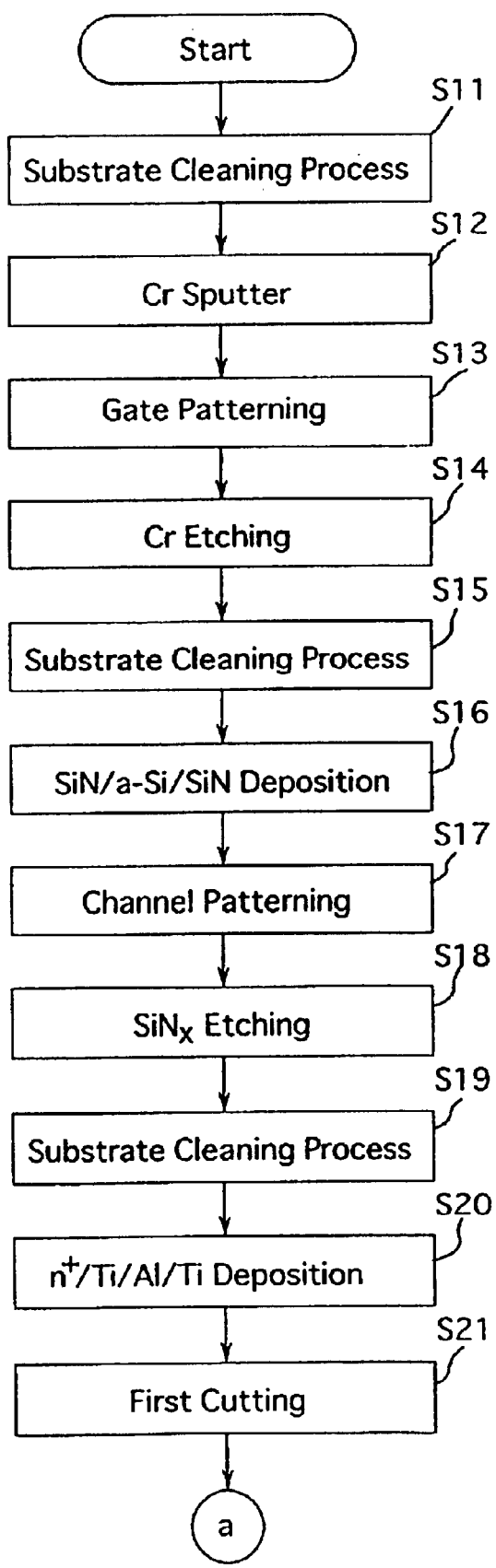
FIG. 10A is a flowchart (1) showing the manufacturing method of a liquid crystal panel according to the first embodiment of the present invention.
Figure 10B:
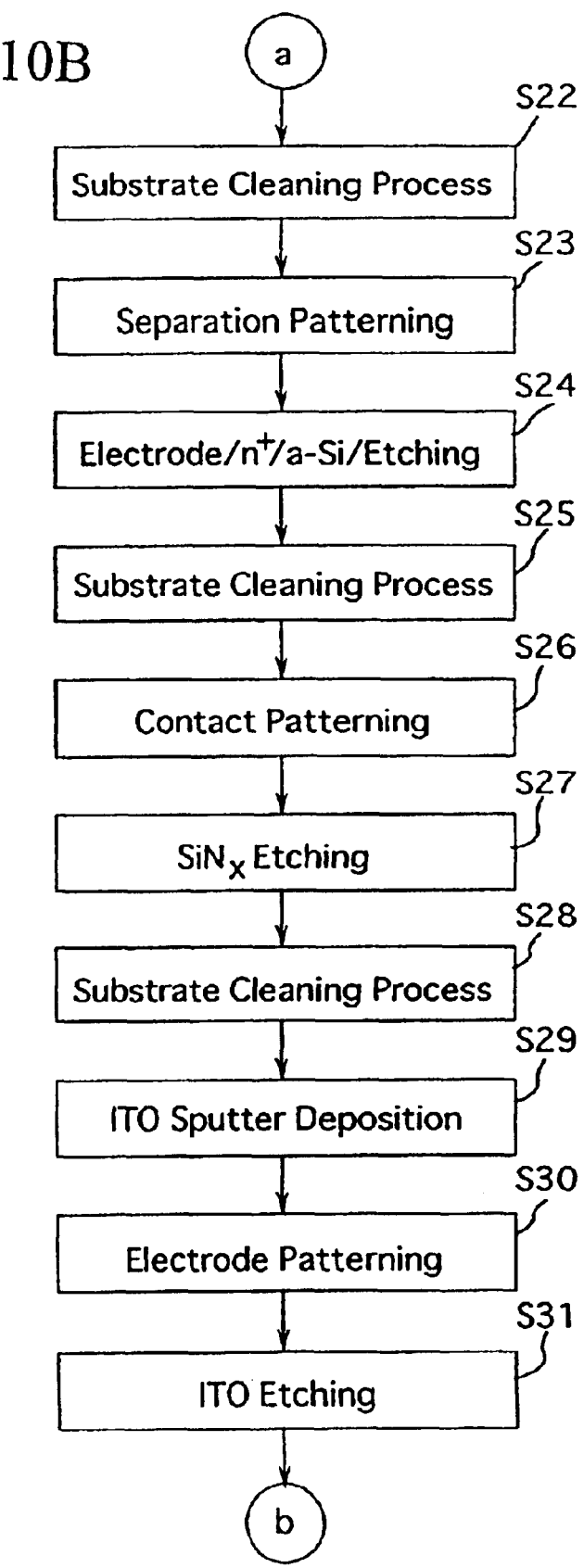
FIG. 10B is a flowchart (2) showing the manufacturing method of a liquid crystal panel according to the first embodiment of the present invention.
Figure 10C:
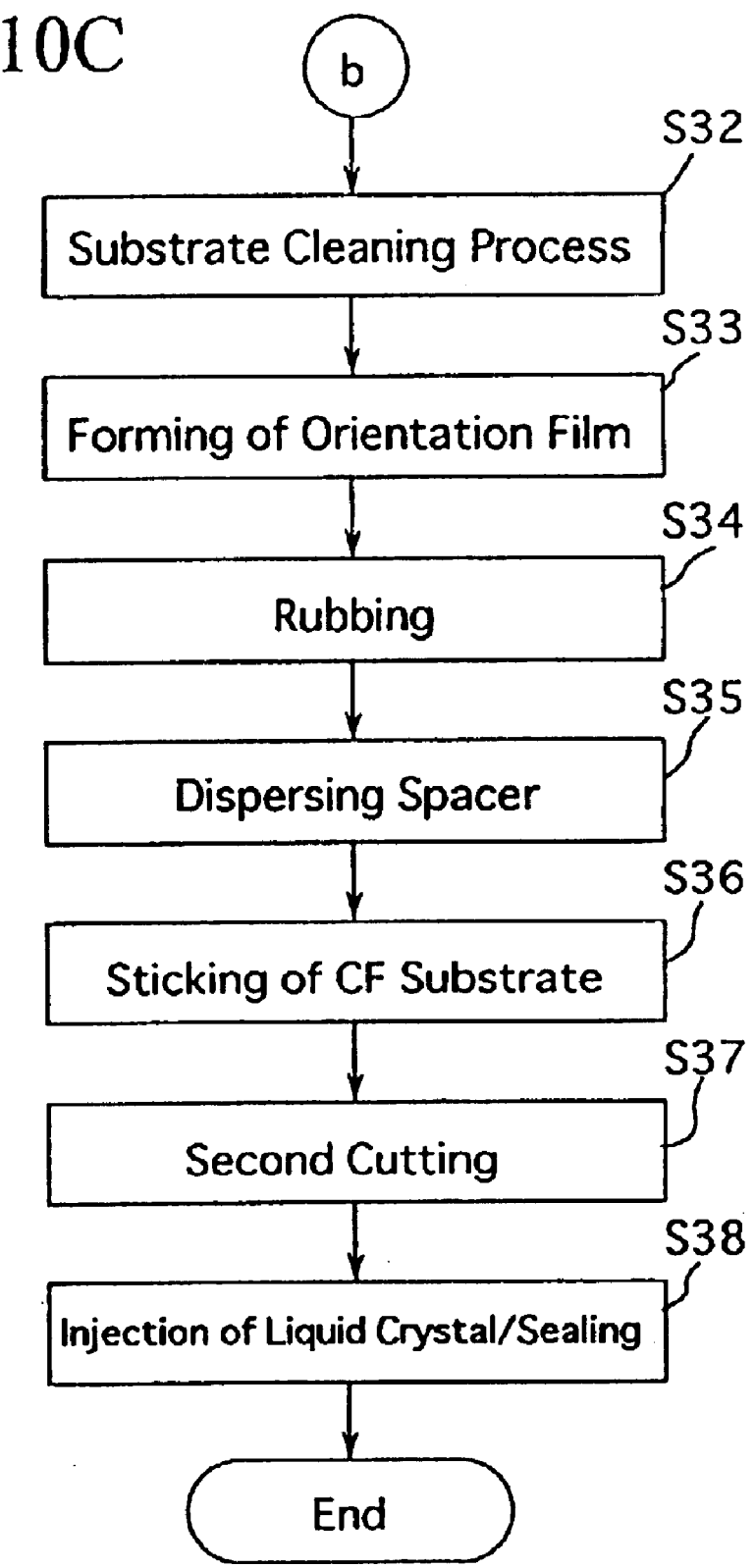
FIG. 10C is a flowchart (3) showing the manufacturing method of a liquid crystal panel according to the first embodiment of the present invention.

FIGS. 10A to 10C are flowcharts, each of which shows the method for manufacturing a liquid crystal panel according to the first embodiment. FIG. 10A shows a flow of steps in a state of the master glass substrate; FIG. 10B shows a flow of steps in a state of the sub-substrate; and FIG. 10C shows a flow of panel steps.

Hereinafter, the first embodiment will be described in detail by referring to the flowcharts of FIGS. 10A to 10C, the plan views of FIGS. 7A and 7B respectively showing the master glass substrate and the sub-TFT substrate, and the sectional views of FIGS. 11A to 11I, each of which shows the manufacturing method in the order of steps. In this example, the master glass substrate 10 is divided into the four blocks 11a to 11d. But as shown in FIG. 7A, an orientation flat 13 for deciding a direction of the substrate is provided beforehand in the left upper corner of the master glass substrate. In the other corner, a corner cut 14 is provided. The orientation flat 13 is a notch having a length of a portion indicated by x1 set to 2.0 mm, and a length of a portion indicated by y1 set to 5.0 mm. The corner cut 14 is a notch having lengths of portions indicated by x2 and y2 equally set to 1.5 mm. A reference mark 15 for alignment is provided in the vicinity of the corner of each of the blocks 11a to 11d.

Figure 11A:
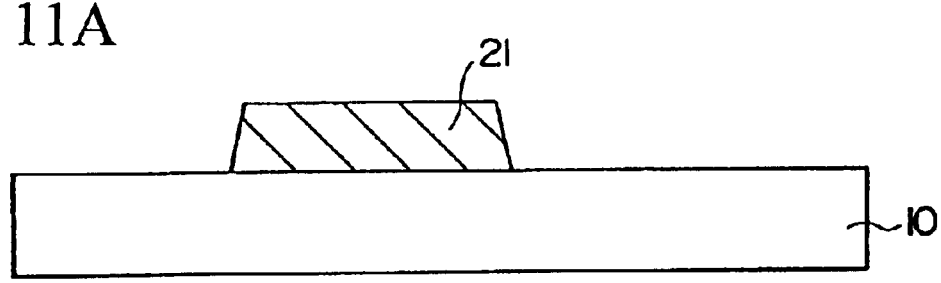
FIGS. 11A to 11C is a sectional view (1) showing the manufacturing method of a liquid crystal panel according to the first embodiment of the present invention.

First, in step S11 of the flowchart of FIG. 10A, a substrate cleaning process is carried out for cleaning the surface of the master glass substrate 10. Next, in step S12, Cr (chrome) is sputtered on one surface (hereinafter referred to as an upper surface) of the master glass substrate 10 to form a Cr film having a thickness of 0.15 to 0.2 $\mu$m. Next, the process moves to step S13 to form a resist film having a specified pattern on the Cr film by using a photoresist. Then, in step S14, the Cr film is etched to form a TFT gate electrode 21, and a wiring (not shown) such as a scanning line or the like of the same wiring layer as that of the gate electrode 21, as shown in FIG. 11A. Subsequently, the resist film is removed.

Figure 11B:
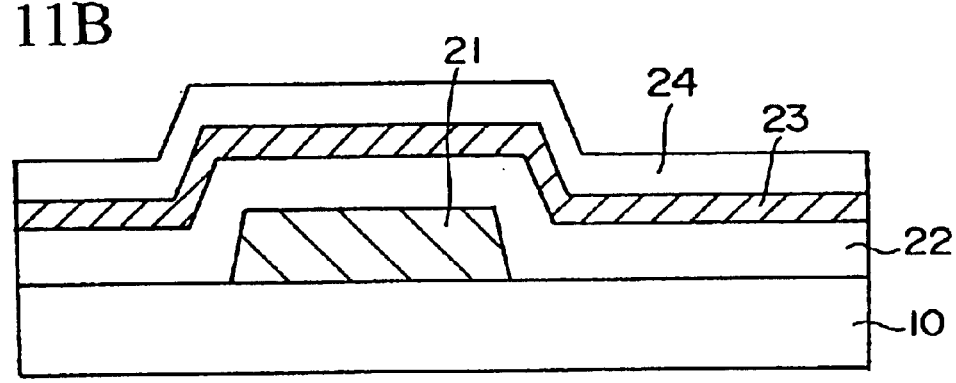

Next, as shown in FIG. 11B, in step S15, a substrate cleaning treatment is executed. In step S16, $SiN_x$ is deposited to have a thickness of 0.3 to 0.4 $\mu$m on the upper side of the master glass substrate 10 so as to form a gate insulating film 22. Also, on the gate insulating film 22, an amorphous silicon (a-Si) film 23 serving as a TFT channel region is formed to have a thickness of 0.03 to 0.1 $\mu$m. Then, on the amorphous silicon film 23, $SiN_x$ is deposited to have a thickness of 0.2 to 0.5 $\mu$m in order to form a channel protective film 24.

Figure 11C:
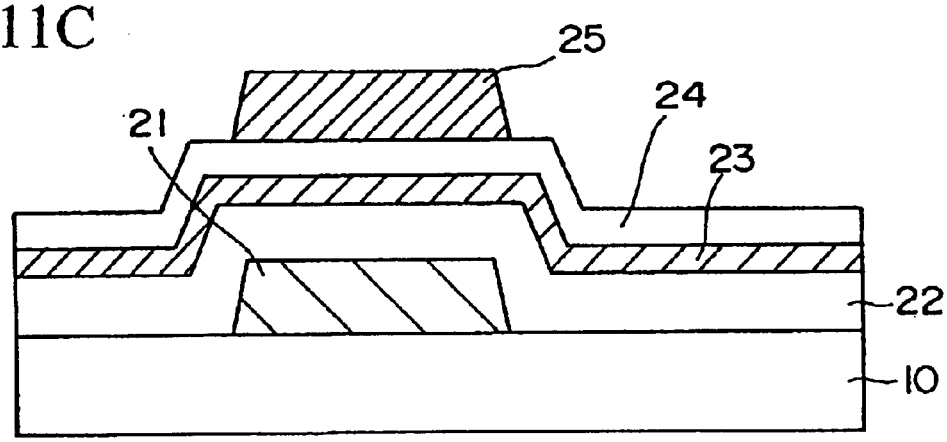

Subsequently, in step S17, a photoresist is coated on the channel protective film 24 to form a photoresist film. This photoresist film is exposed from the lower surface side of the master glass substrate 10. Then, developing treatment is performed to leave a resist film 25 only above the gate electrode 21 as shown in FIG. 11C.

Figure 11D:
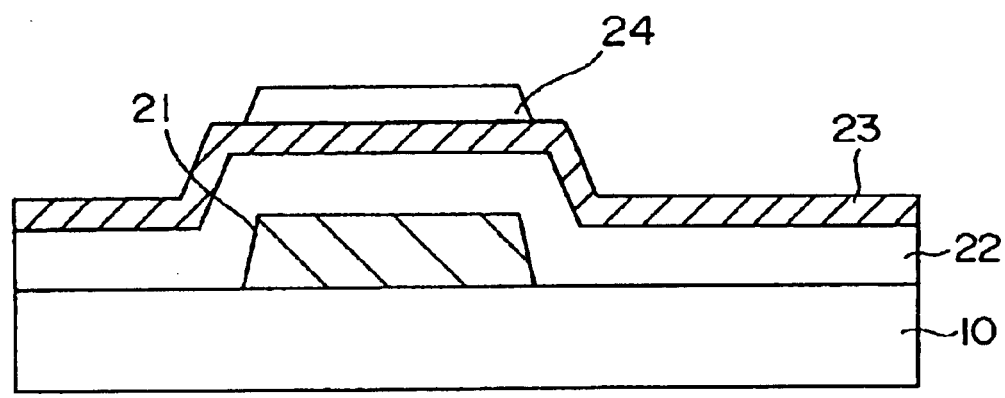
FIGS. 11D and 11E is a sectional view (2) showing the manufacturing method of a liquid crystal panel according to the first embodiment of the present invention.

Then, in step S18, the channel protective film 24 is etched by using the resist film 25 as a mask. Subsequently, as shown in FIG. 11D, the photoresist film 25 is removed. Accordingly, the channel protective film 24 is left only above the gate electrode 21.

Figure 11E:
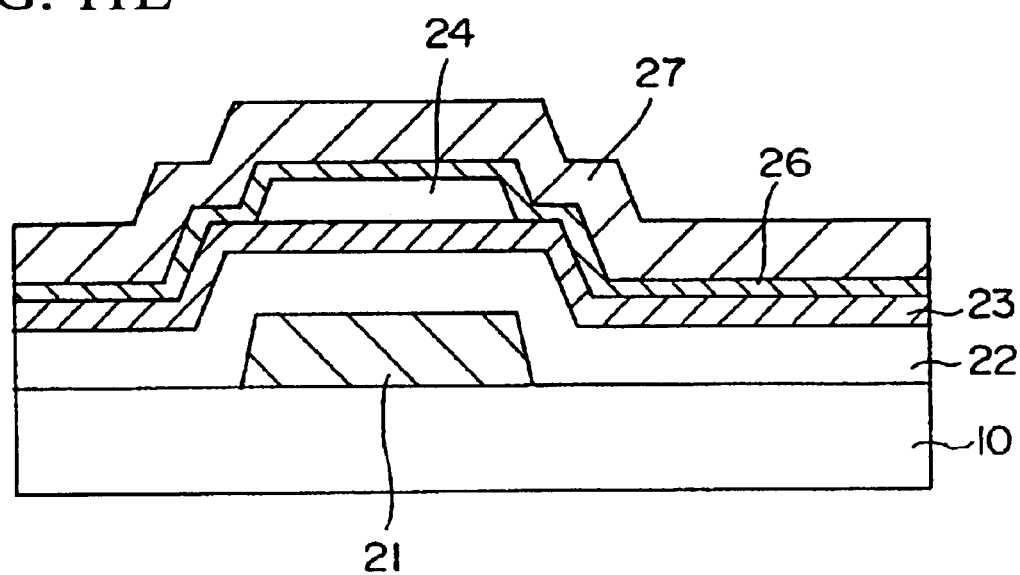

Then, in step S19, the substrate cleaning process is executed. As shown in FIG. 11E, above the master glass substrate 10, an amorphous silicon film 26 doped with n-type impurities and serving as a TFT source/drain region is formed to have a thickness of about 0.02 to 0.03 $\mu$m. Subsequently, in step S20, on the silicon film 26, a Ti (titanium) film having a thickness of 0.05 to 0.1 $\mu$m, an Al (aluminum) film having a thickness of 0.1 to 0.2 $\mu$m, and a Ti film having a thickness of 0.05 to 0.1 $\mu$m are formed in this order. Then, a conductive film 27 having a laminate structure including these Ti, Al and Ti films is formed.

Then, in step S21, primary cutting is performed for the master glass substrate 10, and divided into the four sub-TFT substrates 10a to 10d as shown in FIG. 7A. Then, end face processing is executed for each of the sub-TFT substrates 10a to 10d, and an orientation flat for alignment (indicated by a solid line circle in FIG. 7B) and a corner cut (indicated by a broken line circle in FIG. 7B) are provided.

The process thus far is performed in the first manufacturing line 16 shown in FIG. 6, and the process thereafter is performed in the second manufacturing line 17 shown in the same drawing. In the process thus far, mask alignment during pattern formation is performed by using the fiducial marks 15 provided in the four corners of the master glass substrate 10. In the process described below, description will be made only of the sub-TFT substrate 10a. But the process for the other sub-TFT substrates 10b to 10d is basically the same.

Figure 11F:
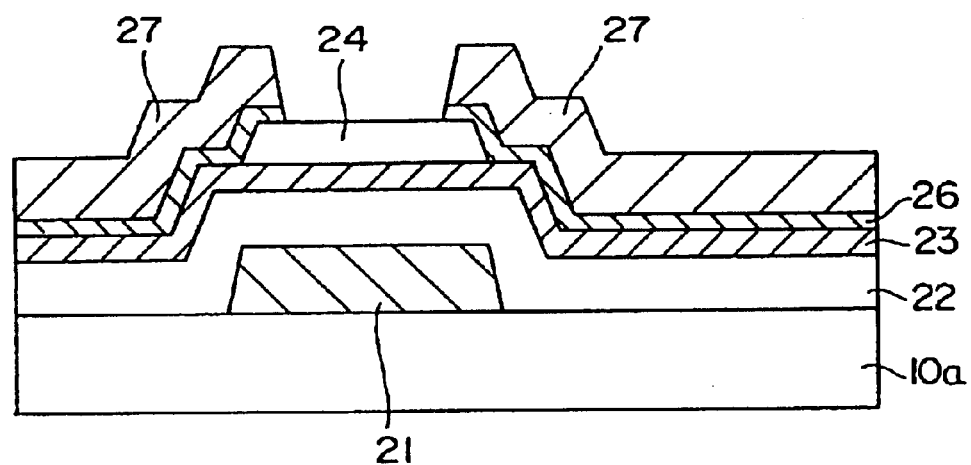
FIGS. 11F and 11G is a sectional view (3) showing the manufacturing method of a liquid crystal panel according to the first embodiment of the present invention.

In step S22, the substrate cleaning process is performed for the sub-TFT substrate 10a after primary cutting. Then, in step S23, a resist film (not shown) having a specified pattern is formed on the conductive film 27 by using a photoresist. Then, in step S24, the conductive film 27 is etched by using this resist film as a mask to form a TFT source electrode, a drain electrode, and a wiring (data line or the like) on the same wiring layer as those of these electrodes, as shown in FIG. 11F. Also, the silicon film 26 on the TFT channel region is then removed by etching.

Figure 11G:
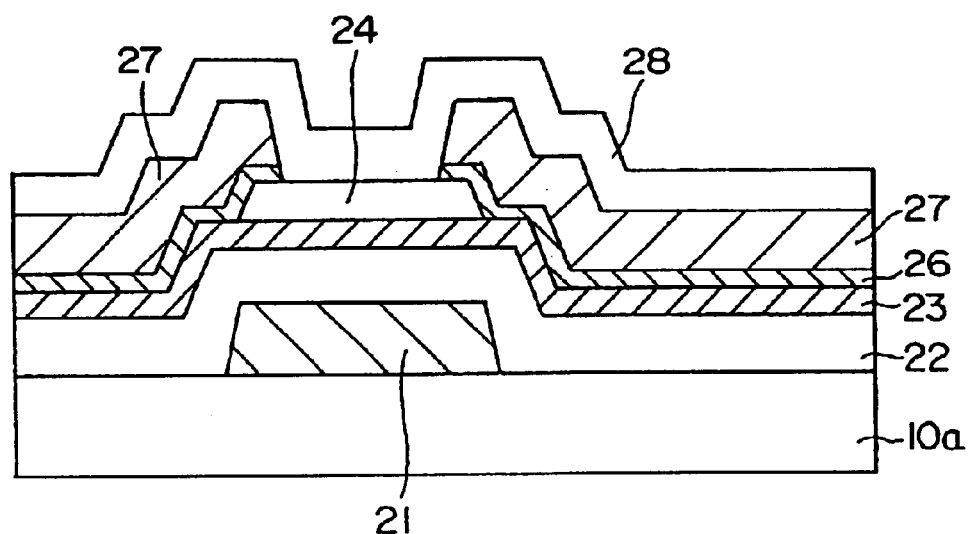
Figure 11H:
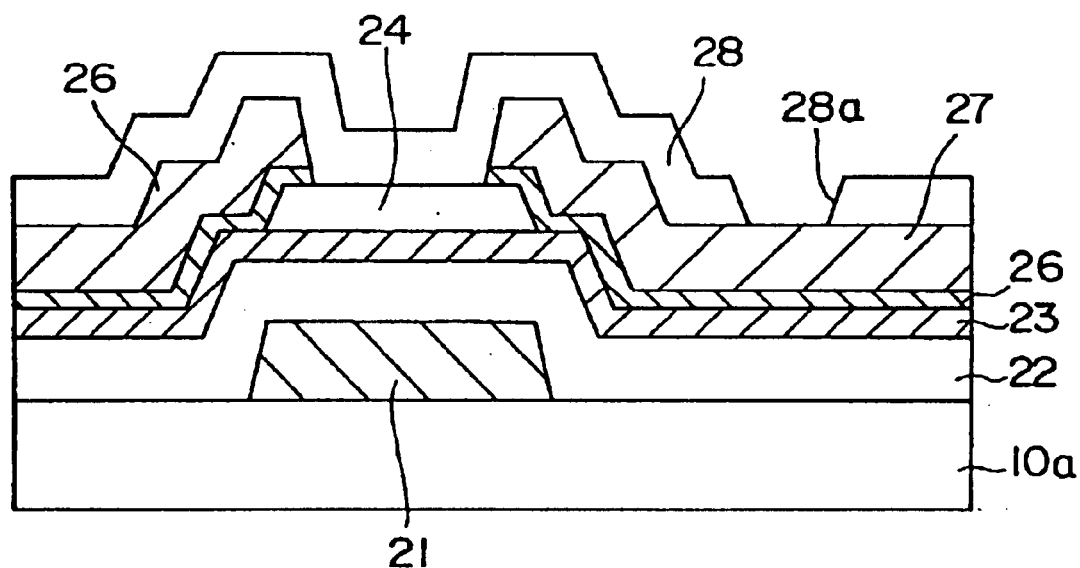
FIGS. 11H and 11I is a sectional view (4) showing the manufacturing method of a liquid crystal panel according to the first embodiment of the present invention.

Subsequently, in step S25, the substrate cleaning process is executed. Then, in step S26, as shown in FIG. 11G, an interlayer insulating film 28 made of $SiN_x$ is formed to have a thickness of 0.3 to 0.4 μm above the sub-TFT substrate 10a. Then, a resist film (not shown) having a contact hole pattern is formed on the interlayer insulating film 28 by using a photoresist. In step S27, the interlayer insulating film 28 is etched by using the resist film as a mask to form a contact hole 28a as shown in FIG. 11H. Then, the resist film is removed.

Figure 11I:
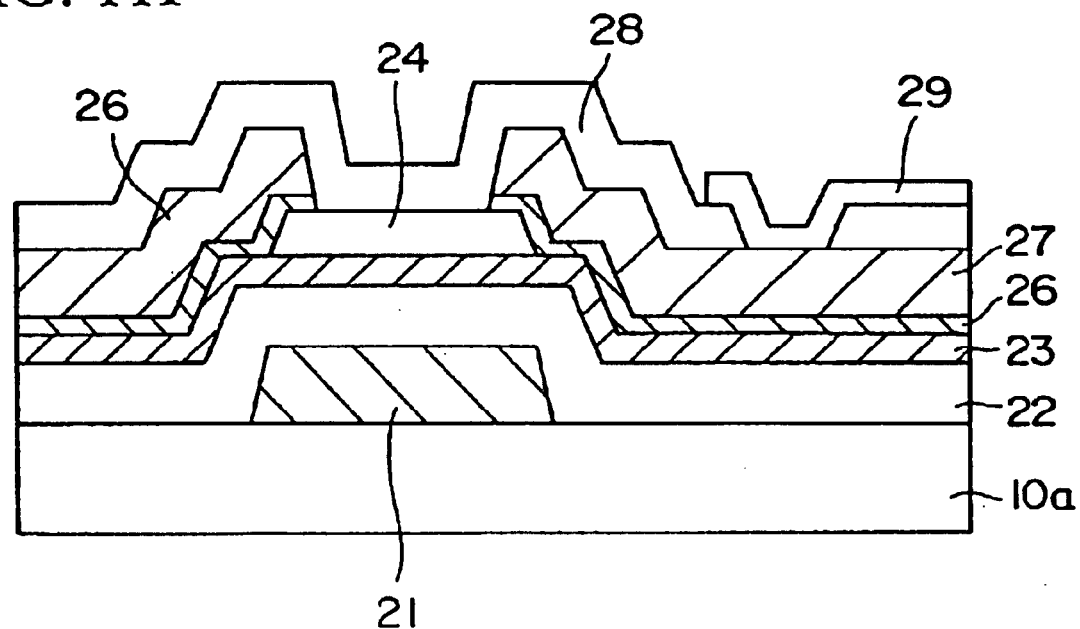
Figure 12:
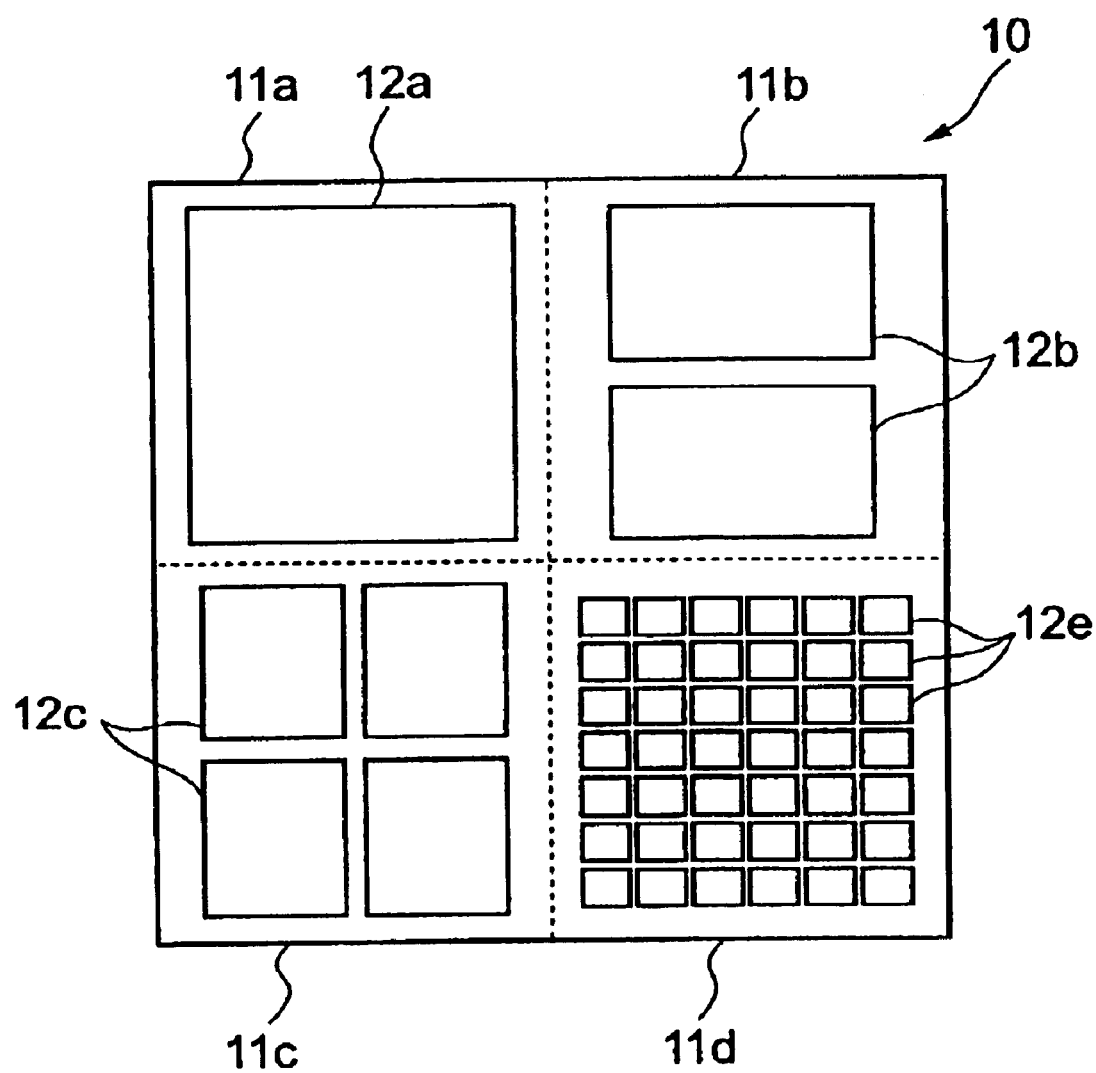
FIG. 12 is a plan view showing an example (1) of combination of a plurality of liquid crystal panels manufactured by using one master glass substrate.

Subsequently, in step S28, the substrate cleaning process is executed. Then, in step S29, an ITO film is formed above the sub-TFT substrate 10a by sputtering. Then, in step S30, a resist film (not shown) having a specified pattern is formed on the ITO film by using a photoresist. Then, in step S31, the ITO film is etched by using the resist film as a mask to form a pixel electrode 29 and a drawer electrode, as shown in FIG. 11I. Then, the resist film is removed. In the process from step S22 to S31, mask alignment during pattern formation is performed by using the fiducial marks provided in the four corners of the sub-TFT substrate 10a.

Subsequently, in step S32, the substrate cleaning process is executed. Then, in step S33, an orientation film (not shown) made of polyimide is formed to have a thickness of 0.05 to 0.1 μm on the pixel electrode 29. In step S34, a surface of the orientation film is subjected to orientation. For this orientation, rubbing treatment for the surface of the orientation film by a cloth roller in one direction is generally employed. A material, a thickness and an orienting method for the orientation film are properly selected in accordance with specifications of a liquid crystal panel to be manufactured.

Subsequently, in step S35, a spherical or cylindrical spacer made of glass or plastic is dispersed above the sub-TFT substrate 10a. In step S36, the sub-TFT substrate 10a is stuck to a CF substrate (see FIG. 9). However, a liquid crystal injection port must be provided in order to inject a liquid crystal between the TFT substrate (sub-TFT substrate 10a) and the CF substrate in the later process. A method for forming the CF substrate is the same as the conventional method, and thus description thereof will be omitted.

Then, in step S37, secondary cutting is performed. In other words, the sub-TFT substrate 10a is cut to make a liquid crystal panel having a specified size.

Subsequently, in step S38, a liquid crystal is injected between the sub-TFT substrate 10a and the CF substrate, and a liquid injection port is sealed with a resin. The kind of a liquid crystal is also selected properly in accordance with specifications of a liquid crystal panel to be manufactured. In this way, the manufacturing of the liquid crystal panel having a structure shown in FIG. 9 is completed. In addition, a glass substrate 41 in FIG. 9 corresponds to a sub-TFT substrate 10a, and a TFT 42 in FIG. 9 corresponds to the TFT composed of the gate electrode 21, the gate insulating film 22 and the silicon films 23 and 26 in FIG. 11I. A pixel electrode 45 in FIG. 9 corresponds to the pixel electrode 29 in FIG. 11I.

In the embodiment, for manufacturing four kinds of liquid crystal panels different from one another in size by using one master glass substrate 10, the process is performed in the state of the master glass substrate 10 by using the first manufacturing line 16 until an arraying step for forming TFT for each pixel. Then, primary cutting is performed for the master glass substrate 10 to separate the same into four sub-TFT substrates 10a to 10d. Thereafter, the process is performed in the state of the sub-TFT substrates 10a to 10d by using the second manufacturing line 17 until a step for joining with a CF substrate.

Thus, in the present embodiment, the use of the first manufacturing line 16 composed of the group of large devices capable of processing in the state of the master glass substrate is limited until the arraying step. The process thereafter is performed by the second manufacturing line 17, which is capable of processing a substrate having a size of ¼ of the master glass substrate. Accordingly, the number of large equipment can be reduced, and plant and equipment investments can be reduced. Since the manufacturing line of, for instance a previous generation, can be used for the second manufacturing line 17, facility utilization factor is high. Also, since plural kinds of liquid crystal panels different from one another in size are formed by using one master glass substrate, a utilization factor of the master glass substrate can be increased by properly combining the sizes of the respective liquid crystal panels. Because of these effects provided in combination, manufacturing costs of a liquid crystal panel can be greatly reduced according to the embodiment. Moreover, according to the present embodiment, by properly selecting the kind of a liquid crystal display panel manufactured by using one master glass substrate, changes in market demands can be flexibly dealt with without reducing productivity.

Furthermore, in the present embodiment, mask alignment in the state of the master glass substrate 10 is performed by using the fiducial marks 15 provided in the four corners of the master glass substrate 10. Mask alignment in the state of the sub-TFT substrate 10a is performed by using the reference marks 15 provided in the four corners of the sub-TFT substrate 10a. Accordingly, the accuracy of alignment is high. For example, when TFT or a pixel electrode is formed in the state of the master glass substrate as in the conventional case, the accuracy of alignment is reduced because of shrinkage or heat history of the master glass substrate. According to the embodiment, however, the process that needs high alignment accuracy in a contact portion between the source/drain and the line, in a contact portion between the pixel electrode and TFT or the like is performed by using the fiducial marks provided in the four corners of the sub-TFT substrate in the state of the sub-TFT substrate. Accordingly, the accuracy of alignment can be set to 2 to 3 μm or lower. In other words, in the liquid crystal display panel manufactured by using the method of the invention, alignment accuracy by shrinkage can be set smaller than a value estimated based on a shrinkage rate of the master glass substrate and a heat history thereof during processing.

In addition, the number of the first and second manufacturing lines 16 and 17 shown in FIG. 6 is one for each. Needless to say, however, a plurality of second manufacturing lines 17 may be provided for one first manufacturing line.

FIGS. 12 to 14B are plan views, each of which shows an example of combination of a plurality of liquid crystal panels manufactured by using one master glass substrate. As in the case of the above example, in FIG. 12, a master glass substrate 10 having a size of 960×1000 mm is used. Then, the master glass substrate 10 is plotted into four blocks 11a to 11d. In the respective blocks, the following regions are secured: in the block 11a, one device-forming region 12a for forming a liquid crystal panel of type 20; in the block 11b, two device-forming regions 12b for forming a liquid crystal panel of type 12; in the block 11c, four device-forming regions 12c for forming a liquid crystal panel of type 10; and in the block 11d, a plurality of device-forming regions 12e for forming a liquid crystal panel of a projection type.

Figure 13A:
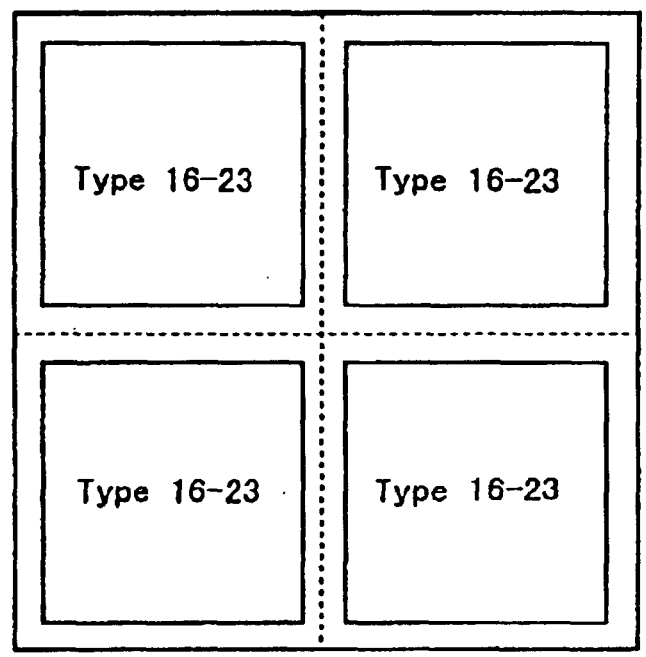
FIGS. 13A and 13B is a plan view showing an example (2) of combination of a plurality of liquid crystal panels manufactured by using one master glass substrate.
Figure 13B:
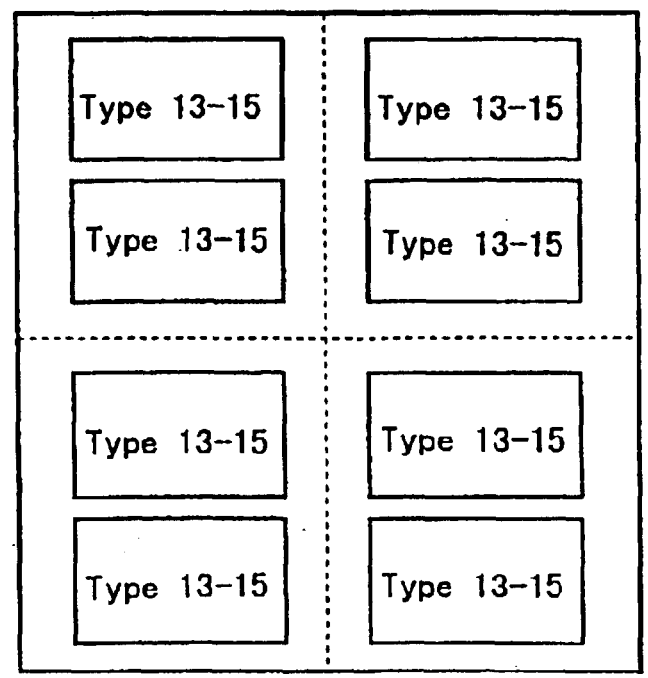
Figure 14A:
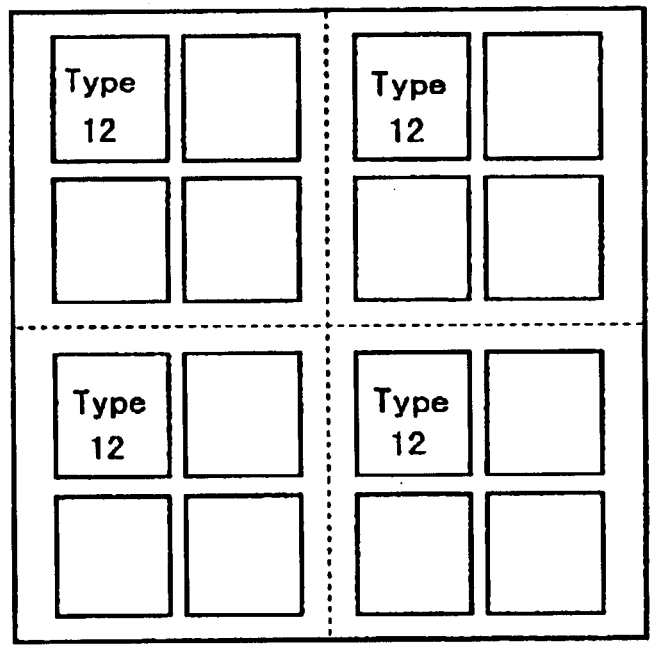
FIGS. 14A and 14B is a plan view showing an example (3) of combination of a plurality of liquid crystal panels manufactured by using one master glass substrate.
Figure 14B:
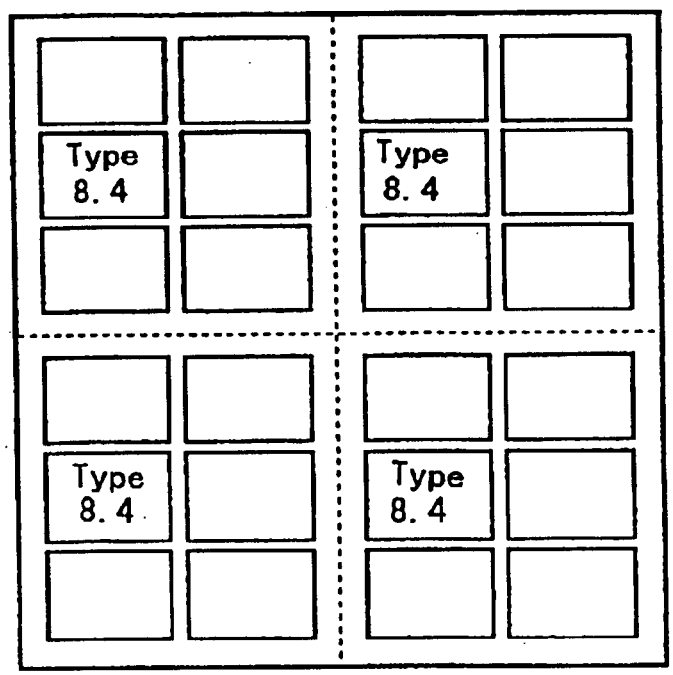

FIG. 13A shows an example of manufacturing four liquid crystal panels of types 16 to 23 by using a master glass substrate of 850×1060 mm. FIG. 13B shows an example of manufacturing eight liquid crystal panels of types 13 to 15 by using a master glass substrate of 850×1060 mm. FIG. 14A shows an example of manufacturing sixteen liquid crystal panels of type 12 by using a master glass substrate of 850×1060 mm. FIG. 14B shows an example of manufacturing twenty four liquid crystal panels of type 8.4 by using a master glass substrate of 850×1060 mm. In any of these cases, as in the case of the above-described first embodiment, the process is carried out in the state of a master glass substrate until an arraying step. Primary cutting is performed for the master glass substrate in portions indicated by broken lines in the drawing to divide the same into sub-TFT substrates. Then, after a pixel electrode, an orientation film, and so on, are formed in the state of the sub-TFT substrate, the substrate is joined with a CF substrate. Secondary cutting is performed for the sub-TFT substrate to form a specified liquid crystal panel. Then, a liquid crystal is sealed between the TFT substrate and the CF substrate.

Second Embodiment

Figure 15A:
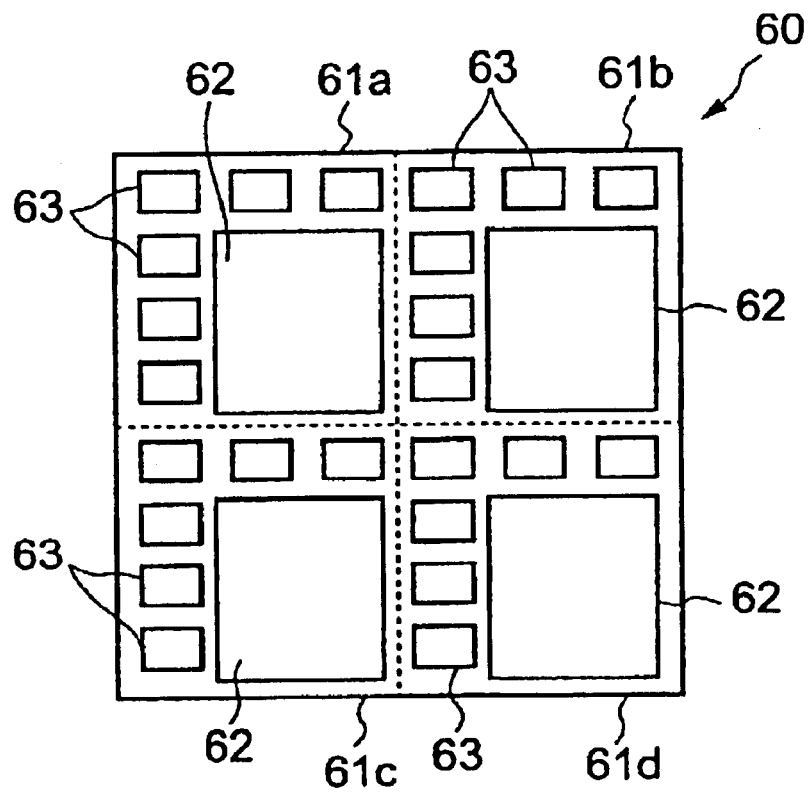
FIGS. 15A and 15B are plan views, each of which shows a method for manufacturing a liquid crystal panel according to a second embodiment of the present invention.
Figure 15B:
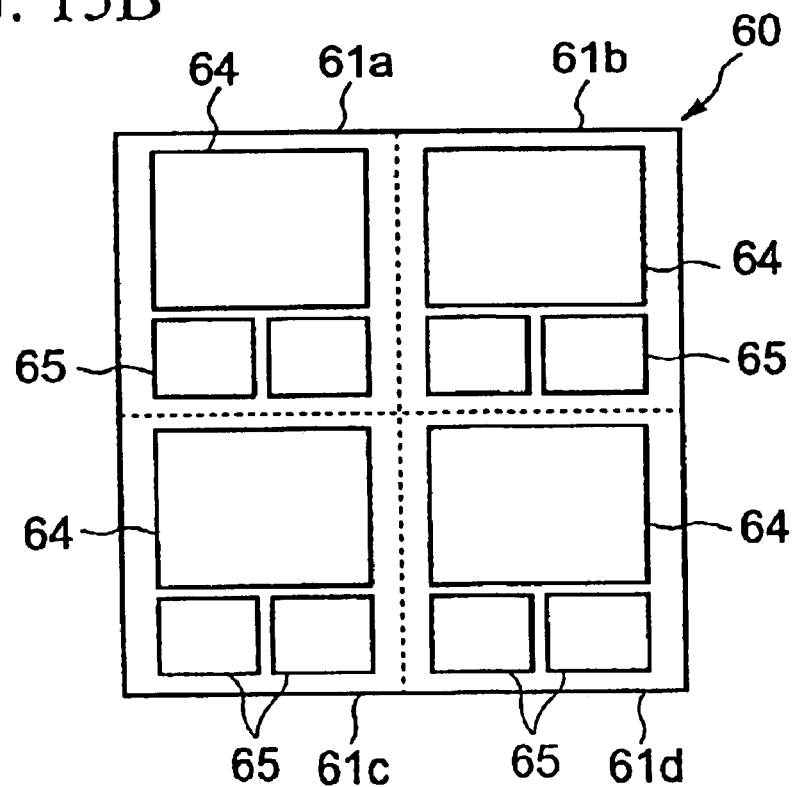

FIGS. 15A and 15B are views, each of which shows a method for manufacturing a liquid crystal panel according to a second embodiment of the present invention.

In the second embodiment, a master glass substrate 60 is plotted into four blocks 61a to 61d. In an example shown in FIG. 15A, the following regions are secured in each of the blocks 61a to 61d: for example, one device-forming region 62 for forming a liquid crystal panel of type 15 for a monitor; and a plurality of device-forming regions 63 for forming liquid crystal panels of types 2 to 3 for portable telephone sets.

In an example shown in FIG. 15B, for example, the following regions are secured in each of the blocks 61a to 61d: one device-forming region 64 for forming a liquid crystal panel of type 15 for a monitor; and two device-forming regions 65 for forming liquid crystal panels of types 6 to 8 for mobile equipments.

In other words, block division is made for each size of a liquid crystal panel to be manufactured in the first embodiment. Two or more kinds of liquid crystal panels different from one another in size, however, are formed in each of the blocks 61a to 61d in the second embodiment. The blocks 61a to 61d have the same structures.

In the second embodiment, as in the case of the first embodiment, a conductive film, an insulating film and a semiconductor film are formed to constitute TFT on a master glass substrate 60 having a size of 960×1000 mm by using the first manufacturing line (see FIG. 6). Then, primary cutting is performed to cut the master glass substrate 60 in portions indicated by broken lines shown in FIGS. 15A and 15B, and divide the same into four sub-TFT substrates having a size of 480×500 mm. Then, the second manufacturing line is used to perform the process thereafter. Secondary cutting is performed after joining with a CF substrate, and then a liquid crystal is sealed between the TFT substrate and the CF substrate. Effects obtained in the embodiment are the same as those in the first embodiment.

Third Embodiment

Figure 16:
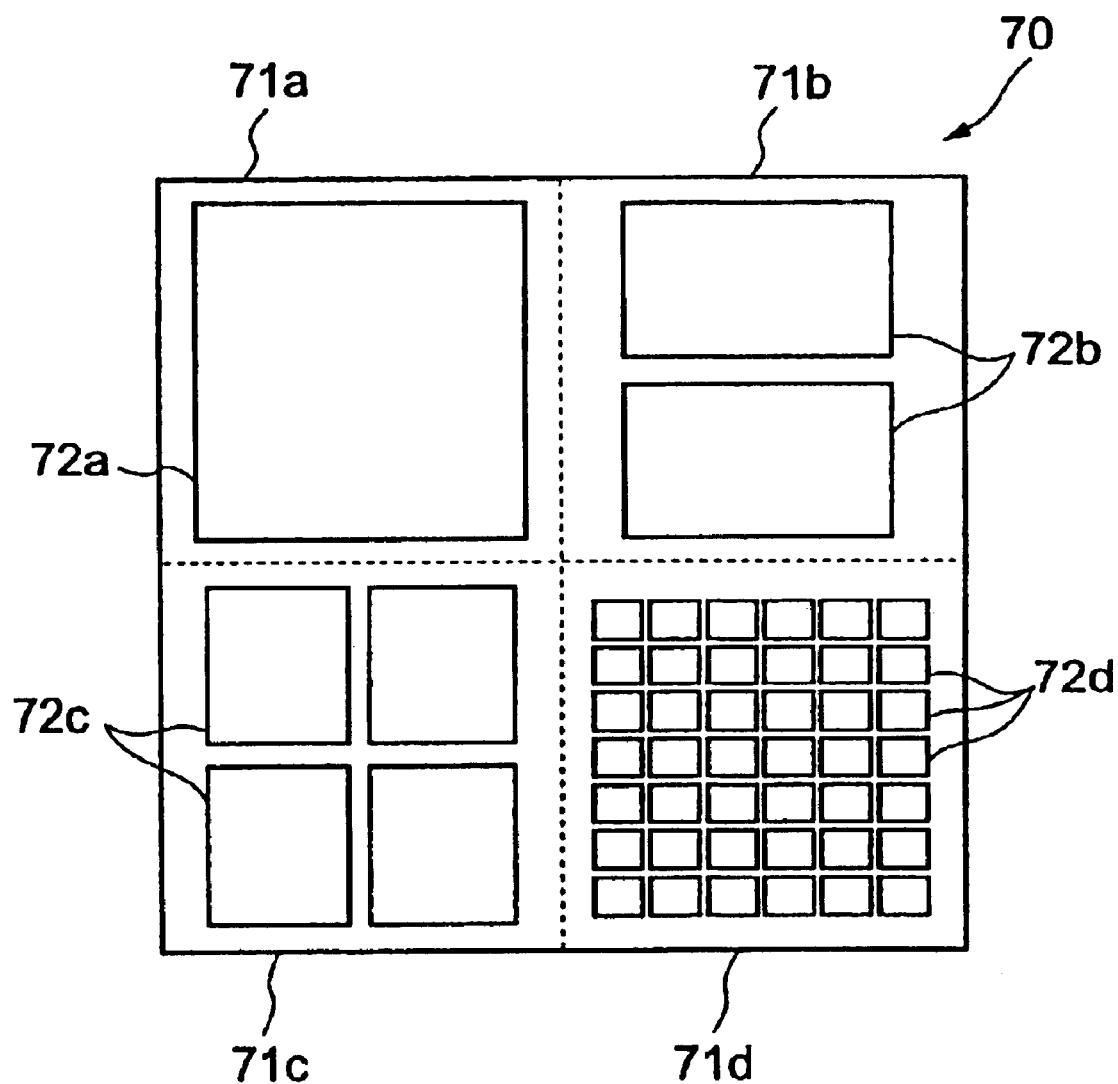
FIG. 16 is a plan view showing in outline a method for manufacturing a liquid crystal panel according to a third embodiment of the present invention.

FIG. 16 is a plan view showing in outline a method for manufacturing a liquid crystal panel according to a third embodiment of the present invention. In the third embodiment, a master glass substrate 70 is plotted into four blocks 71a to 71d. The following regions are secured in the respective blocks: in the block 71a, one device-forming region 72a for forming a liquid crystal panel of type 20; in the block 71b, two device-forming regions 72b for forming liquid crystal panels of types 12 to 15; in the block 71c, four device-forming regions 72c for forming liquid crystal panels of types 10 and 11; and in the block 71d, numerous device-forming regions 72d for forming projection panels of a reflection type of type 1.8. A structure of a liquid crystal display panel formed in each of the blocks 71a to 71d is the same as that shown in FIG. 9.

Figure 17:
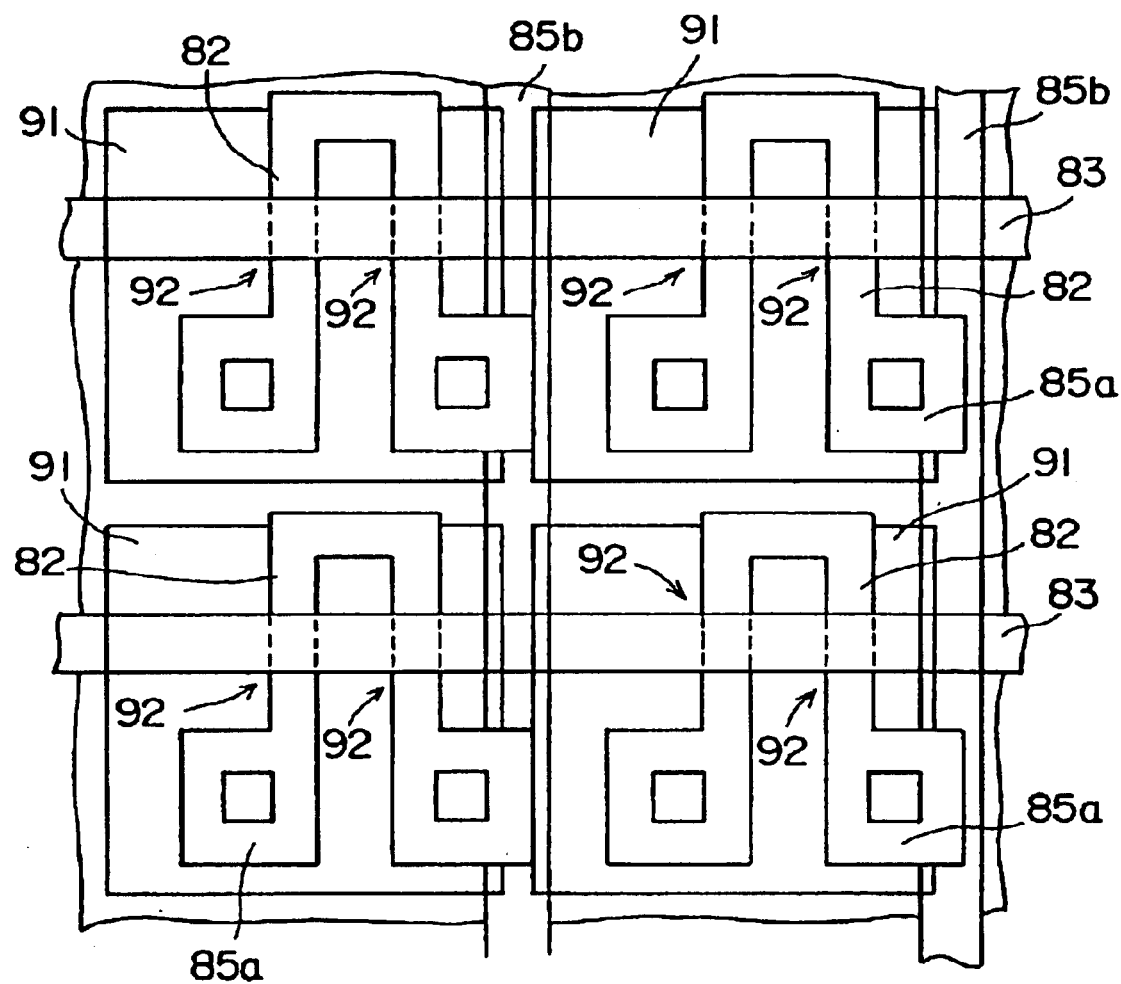
FIG. 17 is a plan view showing a projection panel of a reflection type according to the third embodiment.
Figure 18:
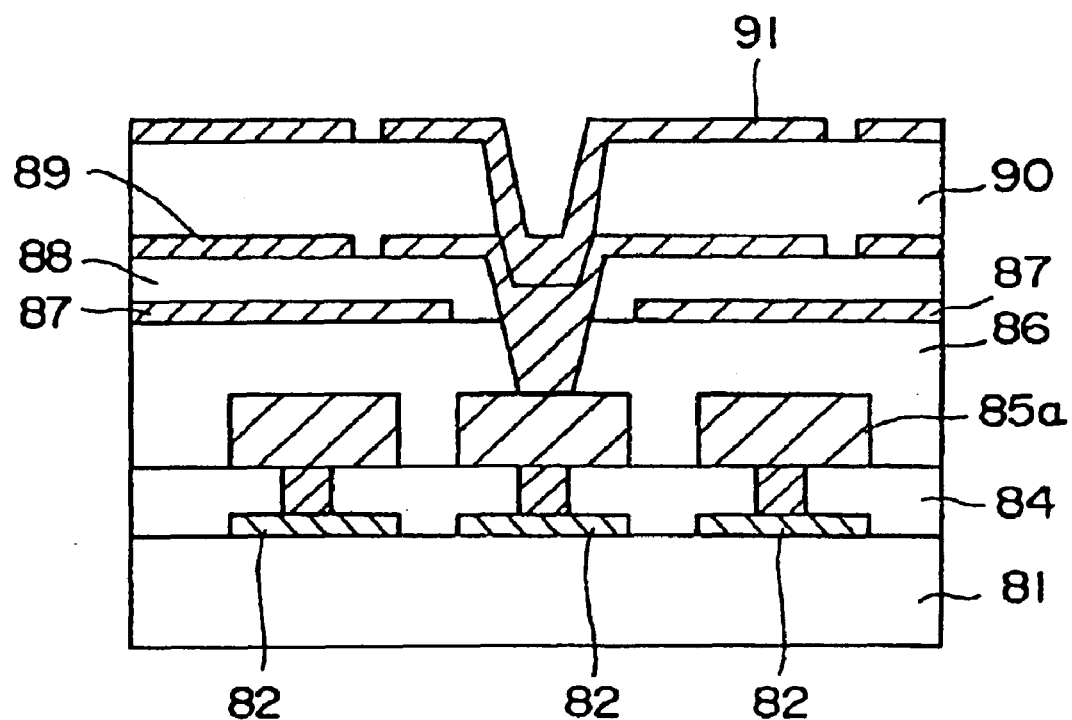
FIG. 18 is a sectional view showing the same projection panel of a reflection type.

FIG. 17 is a plan view showing a projection panel of a reflection type formed in the block 71d; and FIG. 18 is a sectional view of the same. A base film (not shown) made of $SiO_2$ is formed on a glass substrate 81, and a silicon film 82 is selectively formed on this base film. On the silicon film 82, a gate line 83 is formed through a gate insulating film (not shown). The silicon film 82 and the gate line 83 passing above the same constitute two TFT 92 for one pixel. On the base film, an interlayer insulating film 84 made of $SiO_2$ and $SiN_x$ is also formed. The silicon film 82 and the gate line 83 are covered with this interlayer insulating film 84. On the interlayer insulating film 84, an electrode 85a and a signal conductor 85b made of Ti and Al films are formed. The electrode 85a is electrically connected to the silicon film 82 through a contact hole formed in the interlayer insulating film 84.

An interlayer insulating film 86 made of $SiN_x$ is formed on the interlayer insulating film 84. The electrode 85a and the signal line 85b are covered with this interlayer insulating film 86. A common electrode 87 made of Ti is formed to have a specified pattern on the interlayer insulating film 86. Also, on the interlayer insulating film 86, an interlayer insulating film 88 made of $SiN_x$ is formed, and a lower capacitive electrode 89 made of Ti is formed thereon.

In addition, a resin flattening film 90 is formed on the lower capacitive electrode 89. A reflection electrode 91 made of Al is formed on the resin flattening electrode 90.

In the embodiment, as in the case of the first embodiment, the process until formation of the conductive film (the gate line 83 and the electrode 85a), the insulating film (gate insulating film) and the semiconductor film (silicon film 82) for TFT 92 is carried out in the state of a master glass substrate. Then, primary cutting is performed to cut the master glass substrate into the blocks 71a to 71d and separate the same into the sub-TFT substrates. For the sub-TFT substrates of the respective blocks 71a to 71d, the same process as that for the first embodiment is carried out to form liquid crystal panels. For the projection panel of a reflection type, in the sub-TFT substrate processing process, the interlayer insulating film 86, the common electrode 87, the interlayer insulating film 88, the lower capacitive electrode 89, the flattening film 90 and the reflection electrode 91 are formed on the substrate (sub-TFT substrate) 81 in this order.

According to the third embodiment of the invention, processing is executed in accordance with devices to be manufactured after separation into the sub-TFT substrates and, thus, devices different from one another can be manufactured.

Fourth Embodiment

Figure 19:
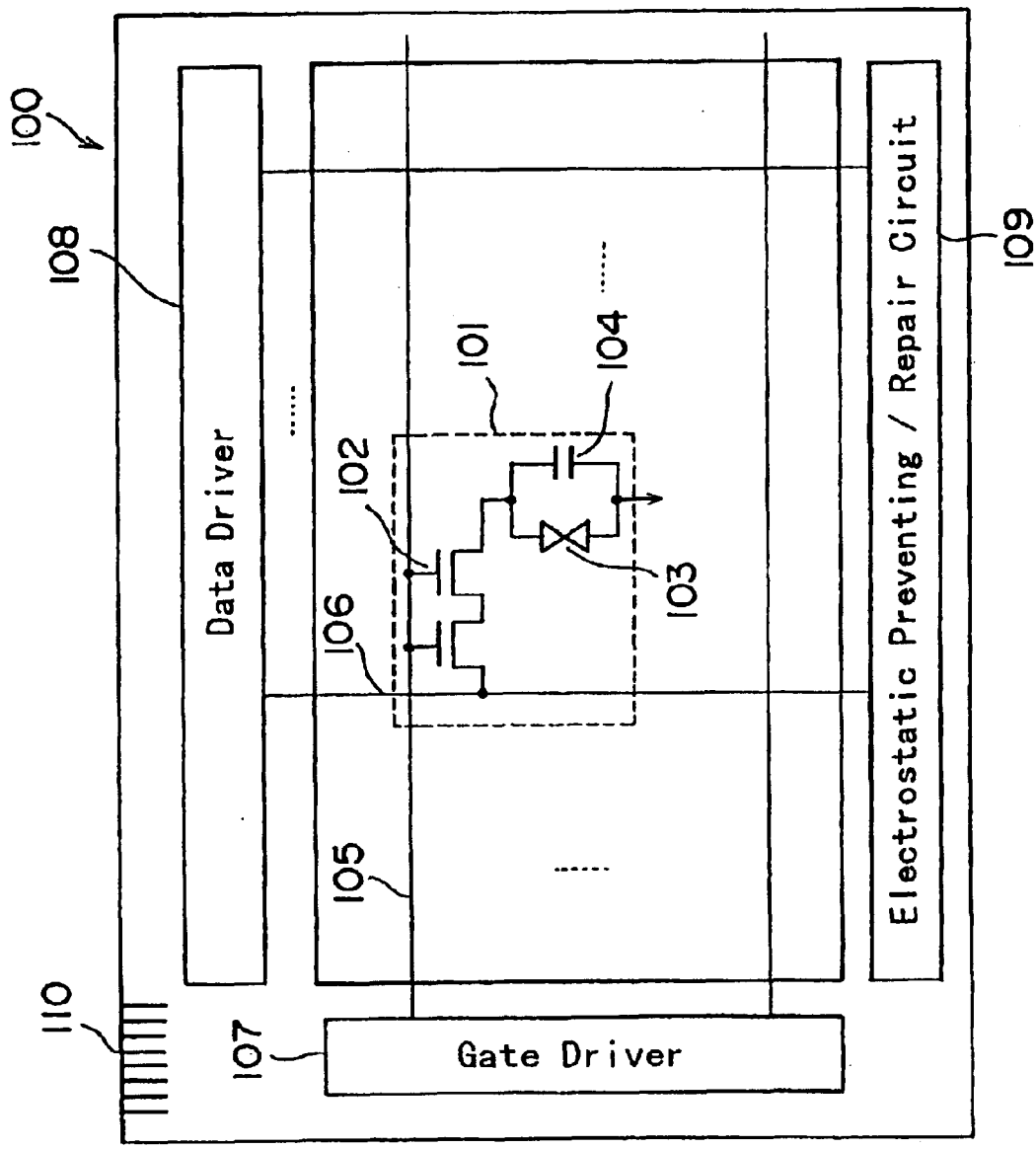
FIG. 19 is a schematic view showing a liquid crystal panel manufactured by a method for manufacturing a liquid crystal panel according to a fourth embodiment of the present invention.

FIG. 19 is a schematic view showing a liquid crystal panel manufactured by a method for manufacturing a liquid crystal panel according to a fourth embodiment of the present invention.

As shown in FIG. 19, a liquid crystal panel 100 manufactured by the method of the fourth embodiment includes a plurality (one is only shown in the drawing) of pixels 101 arranged in a matrix form, and scanning and data lines 105 and 106 for supplying display data to a specified pixel 101 by a specified timing. Each pixel 101 is composed of two low-temperature polysilicon TFT 102 connected in series, a pixel electrode, a counter electrode, a transmitted light quantity control unit 103 composed of a liquid crystal sealed between these electrodes, and an auxiliary capacitive element 104. Outside a display region where the pixels 101 are arranged in the matrix form, an incorporated gate driver 107 and a data driver 108 composed of p-type and n-type TFT, an electrostatic preventing/repairing circuit 109 and an input terminal 110 are formed.

Use of the low-temperature process for forming TFT provides an advantage of using an inexpensive glass plate as a substrate. Since polysilicon TFT has higher driving performance and can be miniaturized compared with amorphous silicon TFT, an open arear ratio can be increased to provide a bright image. Moreover, in the case of amorphous silicon TFT, because of a low driving speed, IC for driving must be separately provided to be connected to the liquid crystal panel. In the case of polysilicon TFT, on the other hand, because of a high driving speed, the driving (driver) circuit can be formed on the glass substrate.

Figure 20:
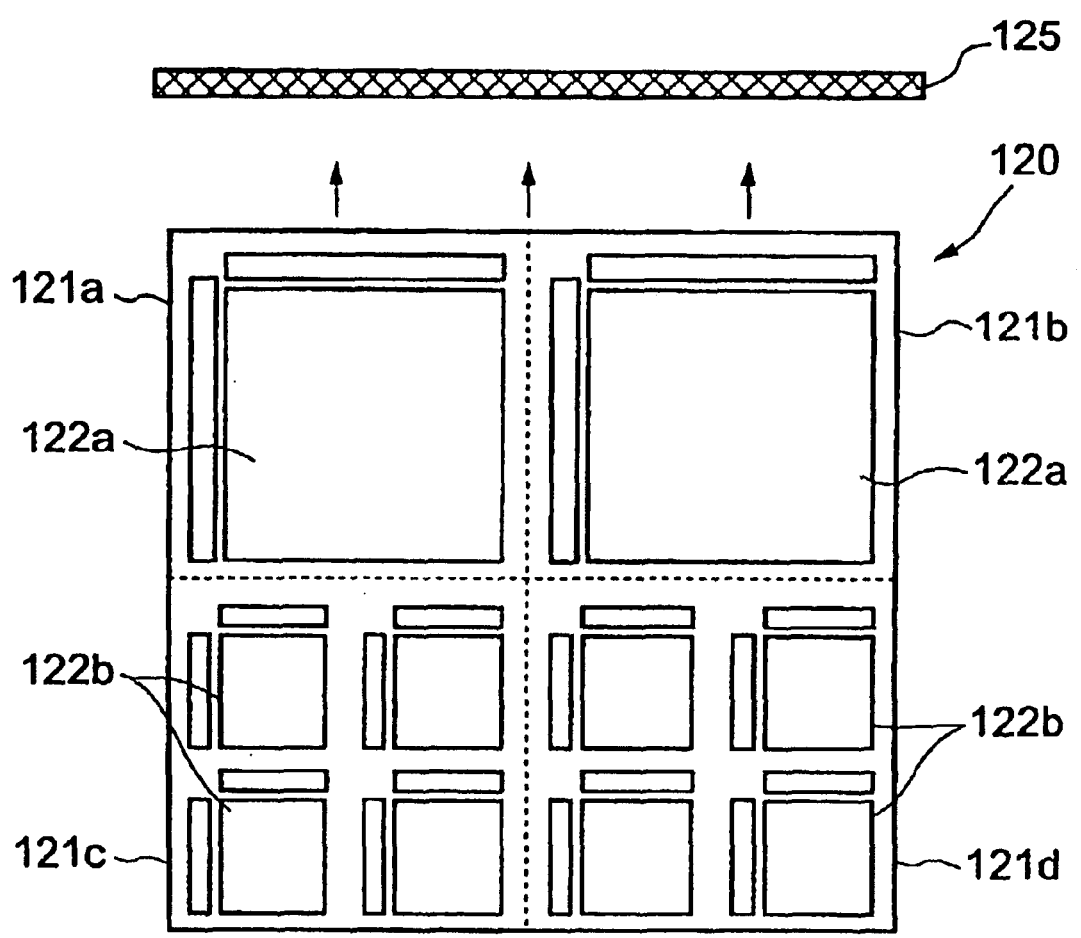
FIG. 20 is a plan view showing in outline the manufacturing method of a liquid crystal panel according to the fourth embodiment.

FIG. 20 is a plan view showing in outline the manufacturing method of a liquid crystal panel according to the fourth embodiment. A master glass substrate 120 having a size of 960×1000 mm is used. This master glass substrate 120 is plotted into four blocks 121a to 121d. In these blocks, for example, the following regions are formed: in each of the blocks 121a and 121b, one device forming region for forming a liquid crystal panel with a built-in driving circuit of type 16; and in each of the blocks 121c and 121d, four device-forming regions for forming liquid crystal panel with built-in driving circuits of type 5. As shown in FIG. 6, the process in the embodiment also uses the first manufacturing line 16 for processing the master glass substrate, and the second manufacturing line 17 for processing a sub-TFT substrate after primary cutting.

Figure 21A:
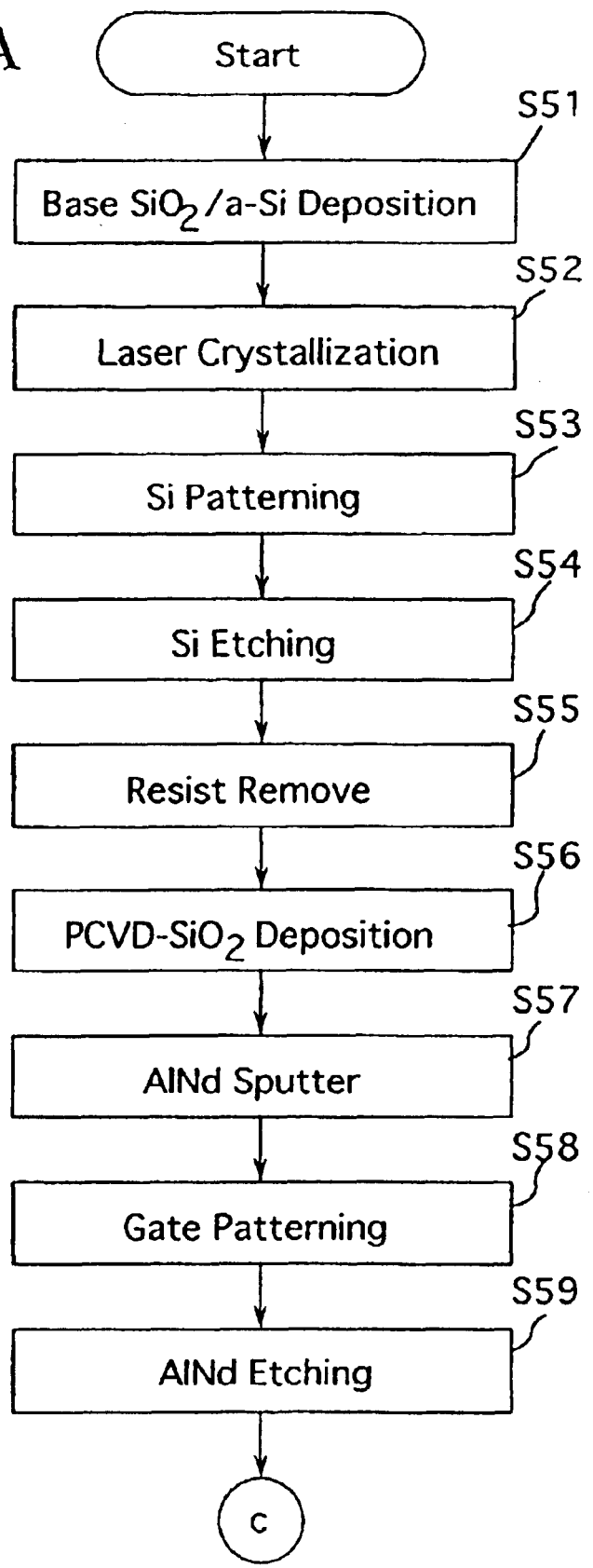
FIG. 21A is a flowchart (1) showing the manufacturing method of a liquid crystal panel according to the fourth embodiment.
Figure 21B:
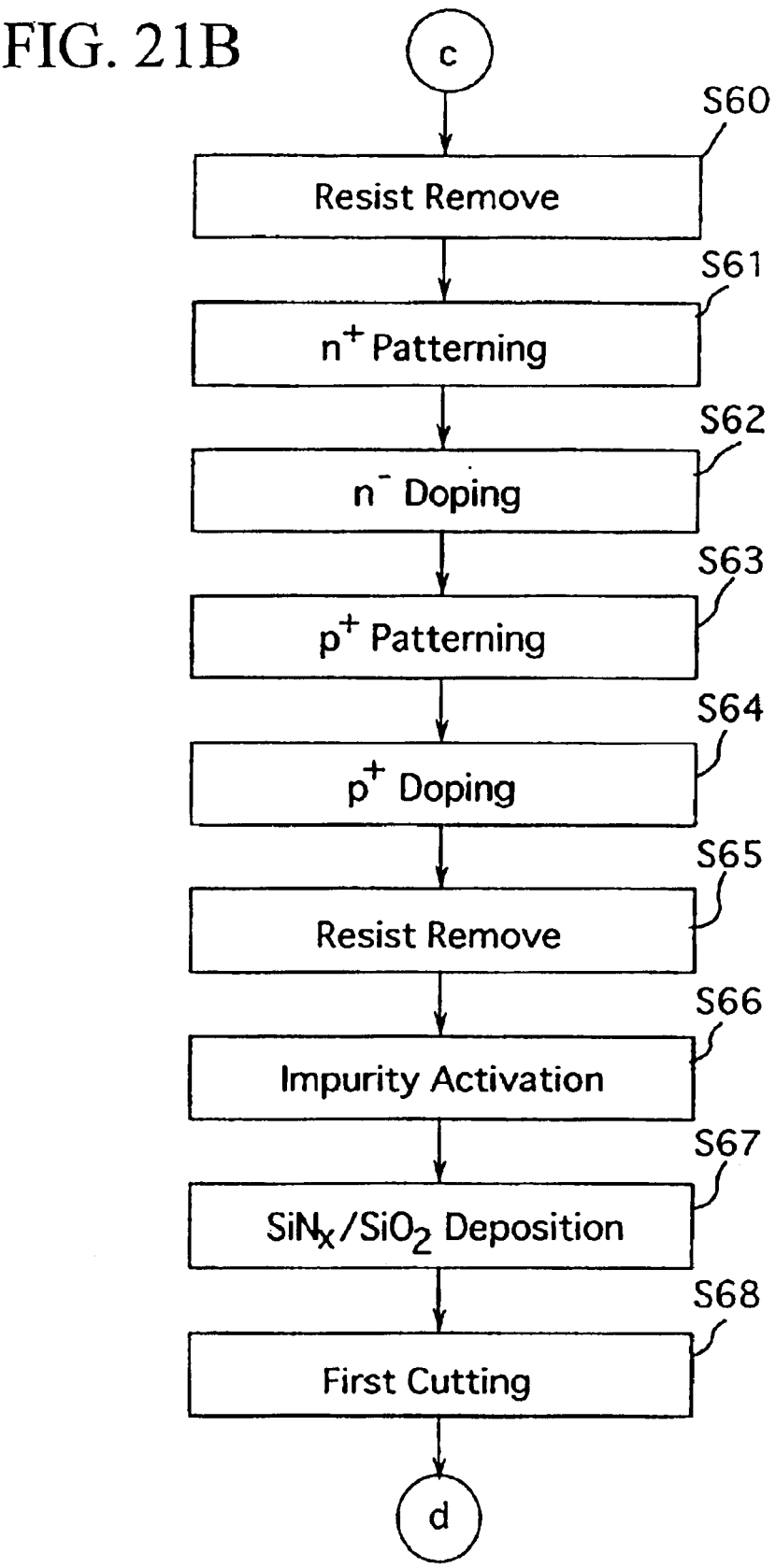
FIG. 21B is a flowchart (2) showing the manufacturing method of a liquid crystal panel according to the fourth embodiment.
Figure 21C:
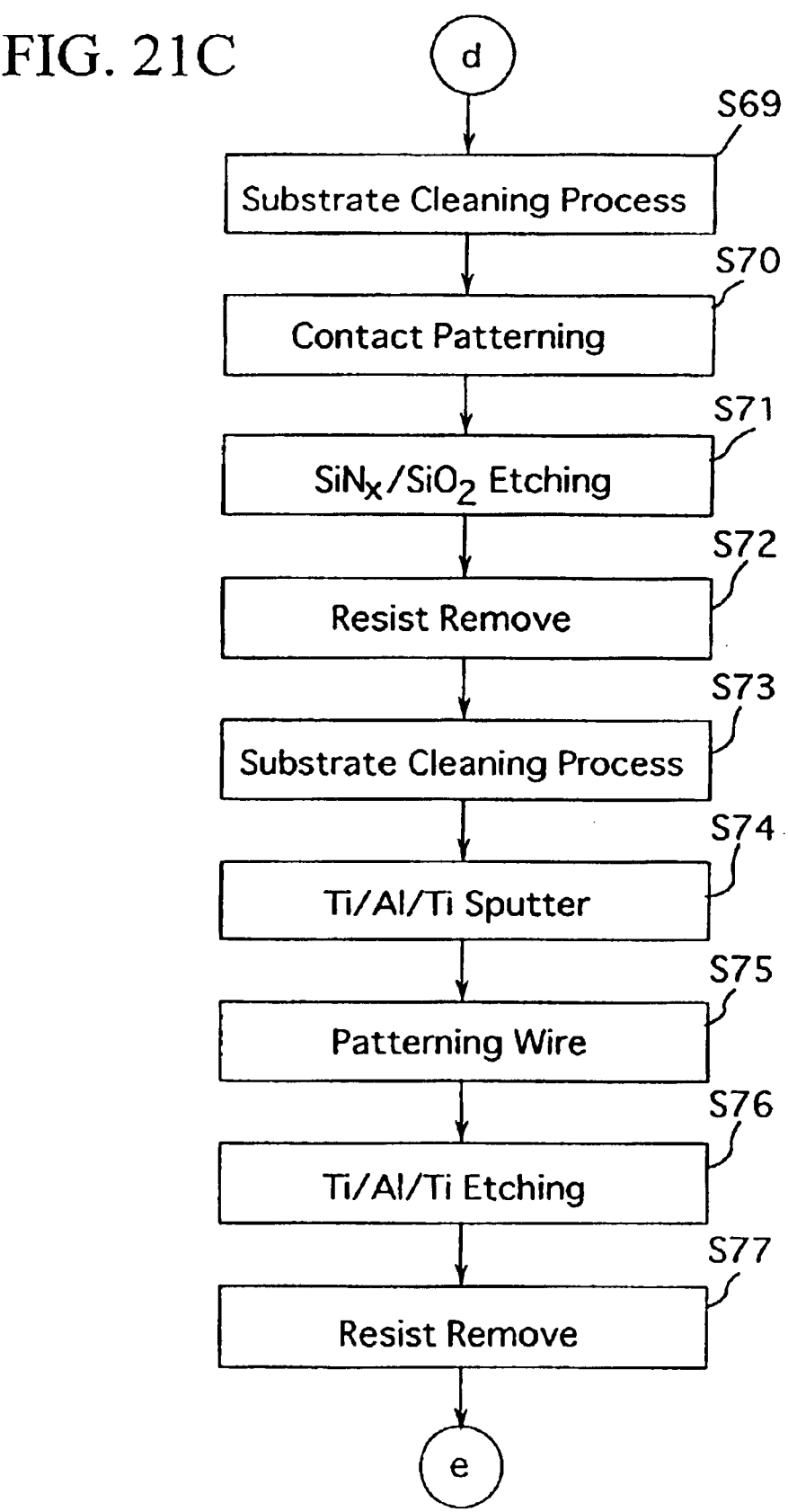
FIG. 21C is a flowchart (3) showing the manufacturing method of a liquid crystal panel according to the fourth embodiment.
Figure 21D:
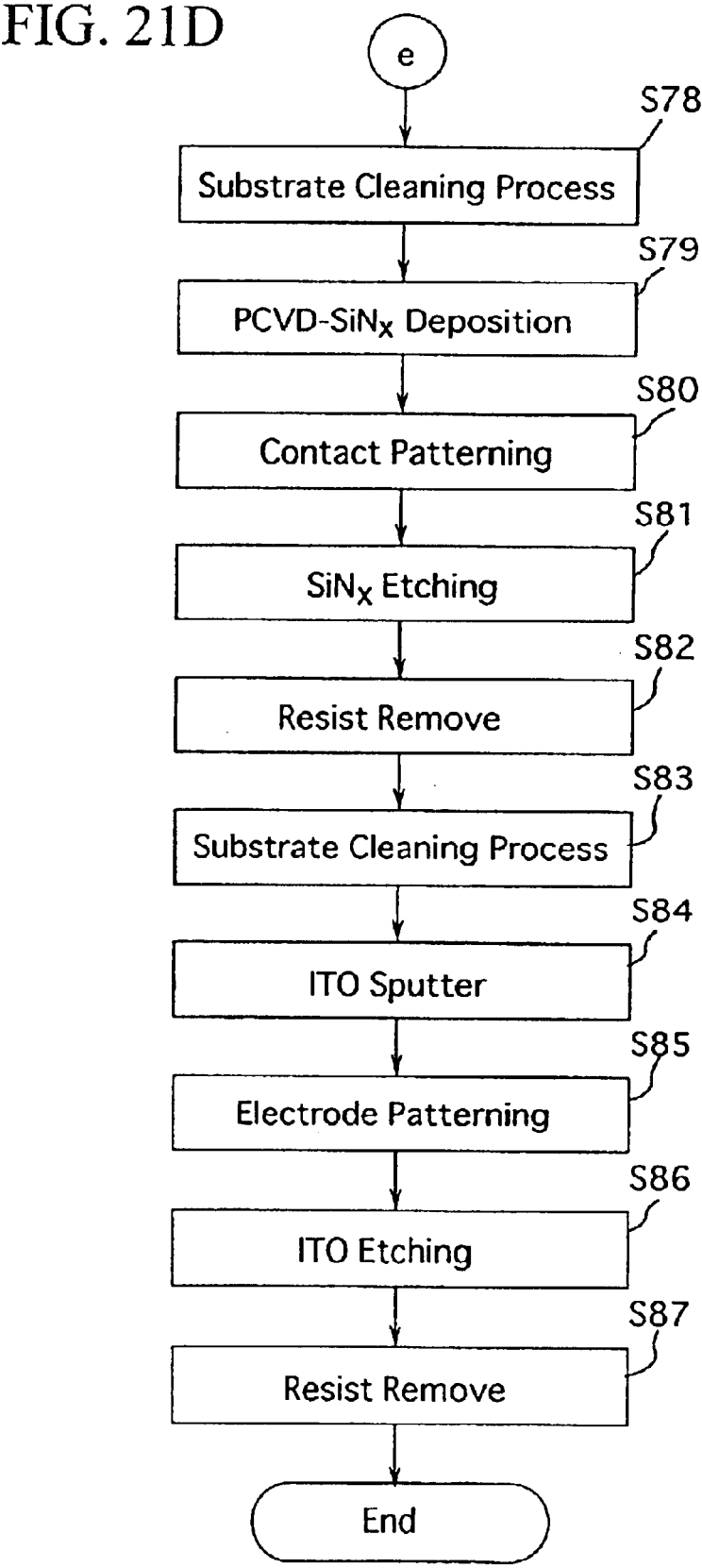
FIG. 21D is a flowchart (4) showing the manufacturing method of a liquid crystal panel according to the fourth embodiment.

FIGS. 21A to 21D are flowcharts, each of which shows the manufacturing method of a liquid crystal panel according to the embodiment. FIGS. 21A and 21B show the process carried out in the state of a master glass substrate; and FIGS. 21C and 21D show the process carried out in the sate of a sub-TFT substrate. FIGS. 22A to 22L are sectional views, each of which shows p-type and n-type TFT portions of peripheral circuits (data driver and scanning driver) and n-type TFT portion in a pixel in the order of manufacturing steps.

Figure 22A:
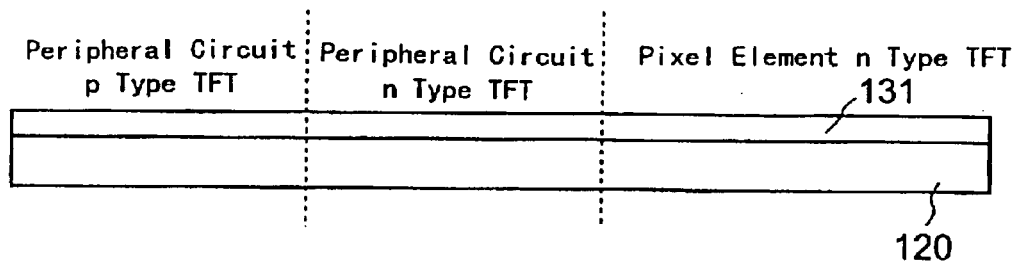
FIGS. 22A to 22D is a sectional view (1) showing the manufacturing method of a liquid crystal panel according to the fourth embodiment.

First, in step S51 of the flowchart shown in FIG. 21A, as shown in FIG. 22A, a substrate cleaning process for cleaning a surface of the master glass substrate 120 is executed, and then $SiO_2$ is deposited on the master glass substrate 120 to form a base film (not shown) having a thickness of 0.2 to 0.3 $\mu$m. To form a base film, SiN may be deposited to have a thickness of 0.05 $\mu$m, and $SiO_2$ may be deposited thereon to have a thickness of 0.2 $\mu$m. Subsequently, an amorphous silicon film 131 is formed on the base film to have a thickness of 0.03 to 0.05 $\mu$m.

Figure 22B:
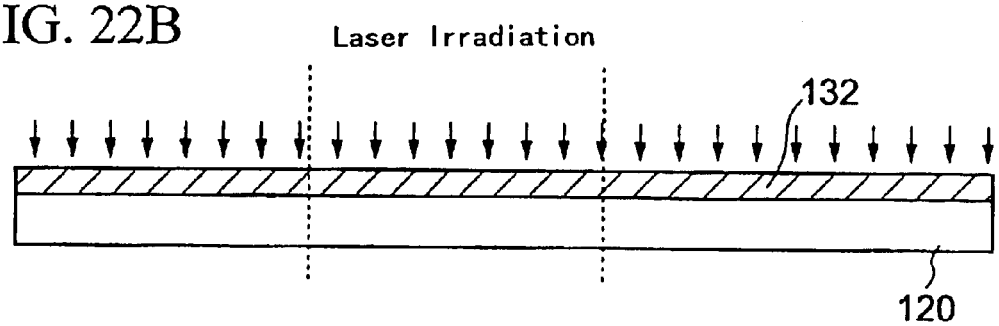

Then, in step S52, as shown in FIG. 22B, the amorphous silicon film 131 is irradiated with a laser beam to convert the amorphous silicon into polysilicon. In this way, a polysilicon film 132 is obtained. In the embodiment, an XeCl excimer laser having a wavelength of 308 nm is used to scan a rectangular laser beam 125 in a direction orthogonal to a longitudinal direction of the beam, as shown in FIG. 20. In the embodiment, liquid crystal panels 122a and 122b should be set to have the same directions as the scanning direction of the laser beam 125 (indicated by arrows in the drawing). In other words, as shown in FIG. 20, the peripheral circuits (gate and data drivers) and the data and scanning lines of one of the liquid crystal panels 122a and 122b should have the same directions in each liquid crystal panel. By making the directions of the respective liquid crystal panels coincide, variance in silicon crystallization between the panels can be reduced, and yield and display performance can be improved. Especially, laser scan lacing can be suppressed. Also, adjustment of display characteristics by an external circuit can be facilitated.

Figure 22C:
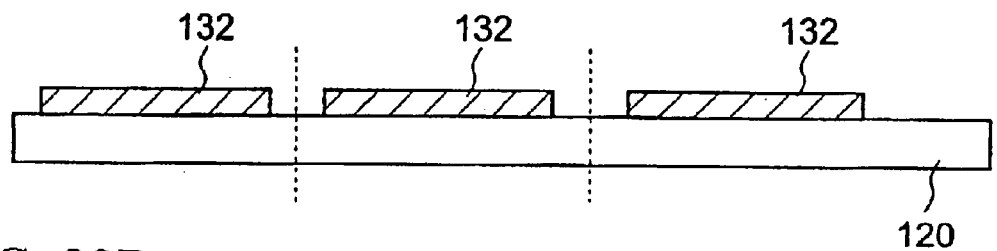

Subsequently, in step S53, a resist film (not shown) having a specified pattern is formed on the polysilicon film 132 by using a photoresist. In step S54, the polysilicon film 132 is etched by using the resist film as a mask to selectively leave the same on the master glass substrate 120, as shown in FIG. 22C. Then, the resist film is removed.

Figure 22D:
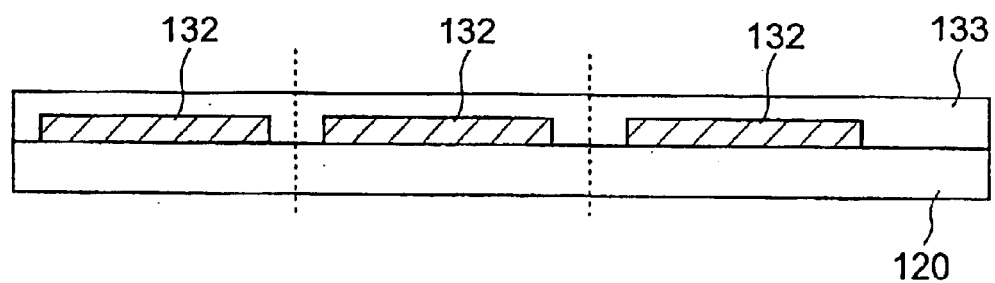

Then, in step S56, as shown in FIG. 22D, by a plasma CVD method, $SiO_2$ is deposited on the full surface of the master glass substrate 120 to form a gate insulating film 133 having a thickness of 0.1 to 0.15 $\mu$m. The gate insulating film may have a two-layer structure of $SiO_2$ and SiN. In this case, for example, a thickness of $SiO_2$ is set to 0.09 $\mu$m, and a thickness of SiN is set to 0.03 $\mu$m. Preferably, a thickness of SiN should be set to approximately ¼ of a thickness of the entire gate insulating film. Then, in step S57, a sputtering equipment is used to form AlNd (aluminum-neodymium) film having a thickness of 0.3 to 0.4 $\mu$m serving as a gate electrode on the gate insulating film 133.

Figure 22E:
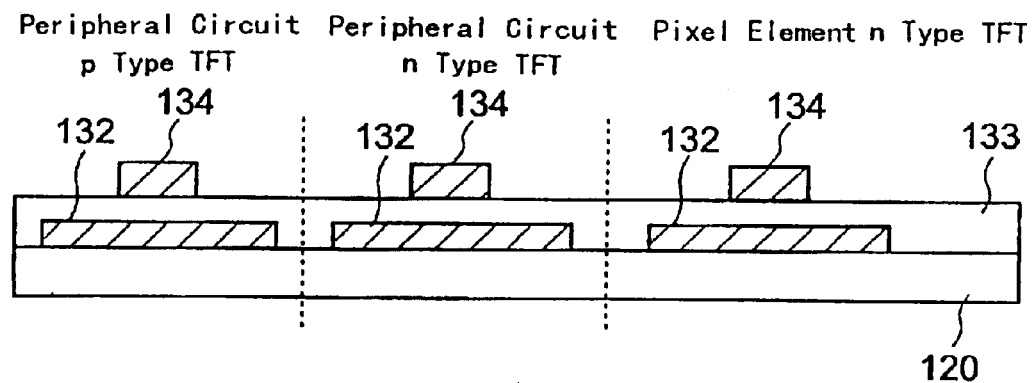
FIGS. 22E to 22G is a sectional view (2) showing the manufacturing method of a liquid crystal panel according to the fourth embodiment.

Then, in step S58, a photoresist film (not shown) is formed on the AlNd film. Exposure and development are performed for the photoresist film to pattern the same in a specified gate pattern shape. Then, in step S59, as shown in FIG. 22E, the AlNd film is etched to leave the same only in a portion below the resist film, and then a gate electrode 134 is formed. Then, in step S60, the resist film is removed.

Subsequently, in step S61, as shown in FIG. 22E, n-type impurities are introduced at high concentration to a region 132a serving as a source/drain of n-type TFT, which is includes in the silicon film 132. In step S62, n-type impurities are introduced at low concentration to the silicon film 132. Then, in step S63, a mask having a specified pattern is formed on the gate insulating film 133 by using a photoresist. In step S64, p-type impurities are introduced through an opening of this mask to a region 132b serving as a source/drain of p-type TFT, which is included in the silicon film 132. Then, in step S65, the mask is removed and, in step S66, heat treatment is performed to activate the impurities.

In this way, specified circuits (data and scanning drivers) using n-type TFT of the display region and p-type and n-type TFT of the peripheral circuit portion are formed.

Figure 22F:
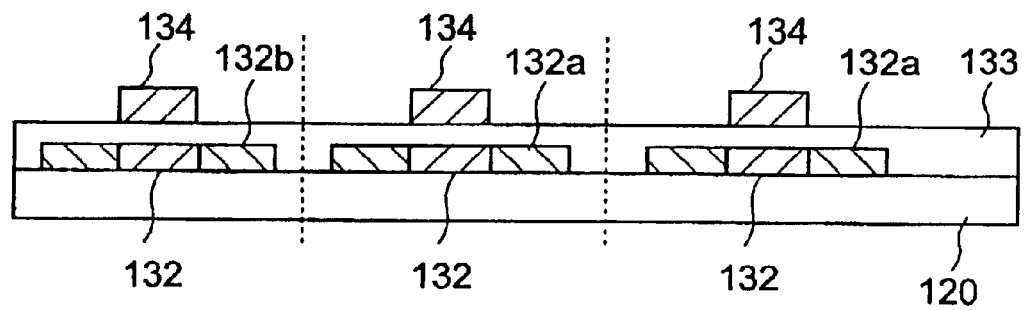
Figure 22G:
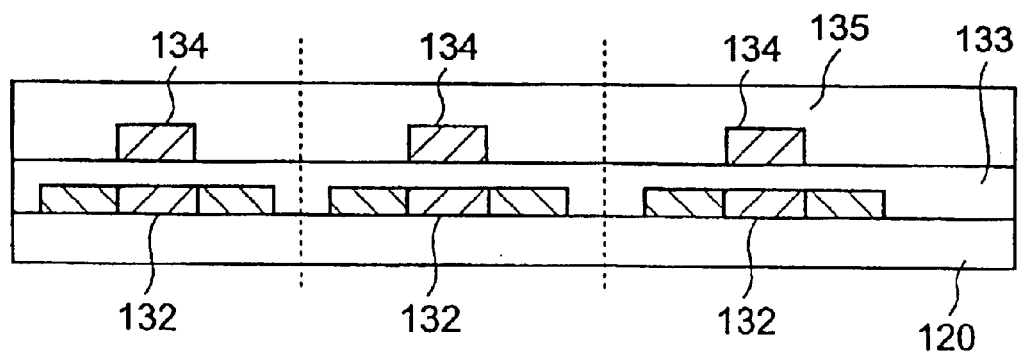
Figure 22H:
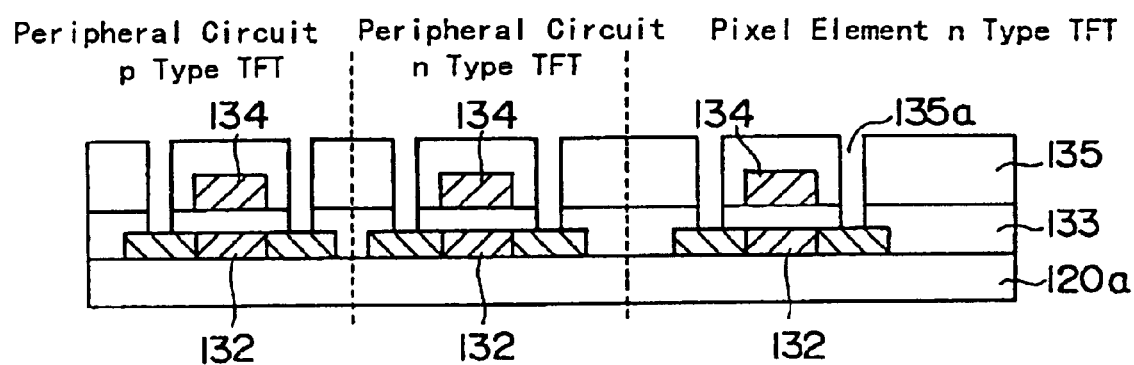
FIGS. 22H and 22I is a sectional view (3) showing the manufacturing method of a liquid crystal panel according to the fourth embodiment.

Subsequently, in step S67, as shown in FIG. 22F, $SiN_x$ and $SiO_2$ are deposited in sequence on a full surface above the master glass substrate 120 to form an interlayer insulating film 135. The process thus far is executed by using the first manufacturing line 16 shown in FIG. 6.

Then, in step S68, primary cutting is performed for the master glass substrate 120 to divide the same into four sub-TFT substrates. End face processing is performed for each sub-TFT substrate to form an orientation flat and a corner cut (see FIG. 7). Thereafter, processing is performed by using the second manufacturing line 17 shown in FIG. 6. Hereinafter, description will be made of process carried out for one 120a of the four sub-TFT substrates. It should be understood that similar processing is performed for the other sub-TFT substrates.

Figure 22I:
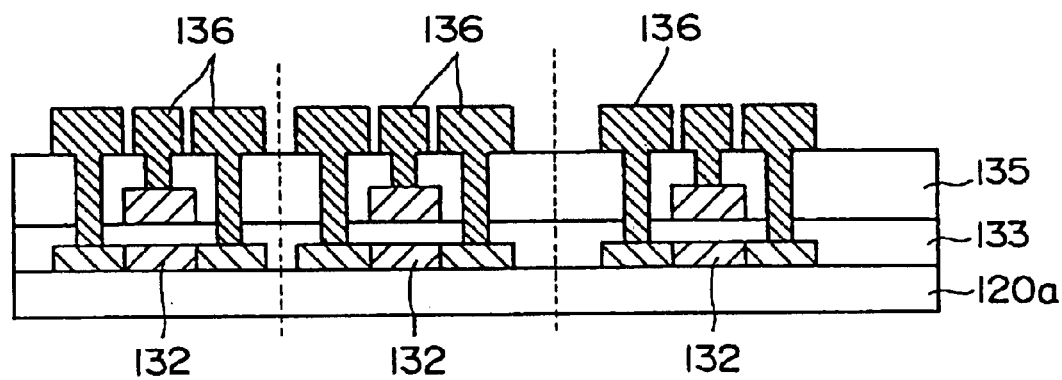

Subsequently, in step S69, a substrate cleaning process is performed for the sub-TFT substrate. Then, in step S70, a mask having a desired contact hole pattern is formed on the interlayer insulating film 85 above the sub-TFT substrate 120a. In step S71, as shown in FIG. 22I, the interlayer insulating film 135 is etched to form a contact hole 135a. Then, in step S72, the mask is removed.

Subsequently, in step S73, a substrate cleaning process is performed for cleaning the sub-TFT substrate 120a. Then, in step S74, Ti, Al and Ti are deposited in sequence above the sub-TFT substrate 120a. The contact hole 135a is covered with these metals, and a conductive film is formed on the interlayer insulating film 135.

Then, in step S75, a photoresist is coated on the conductive film, and exposure and development are performed to form a wiring pattern. Then, in step S76, as shown in FIG. 22I, the conducive film is etched by using the photoresist as a mask to form a wiring and an electrode 136 on the interlayer insulating film 135. Then, in step S77, the photoresist film is removed.

Figure 22J:
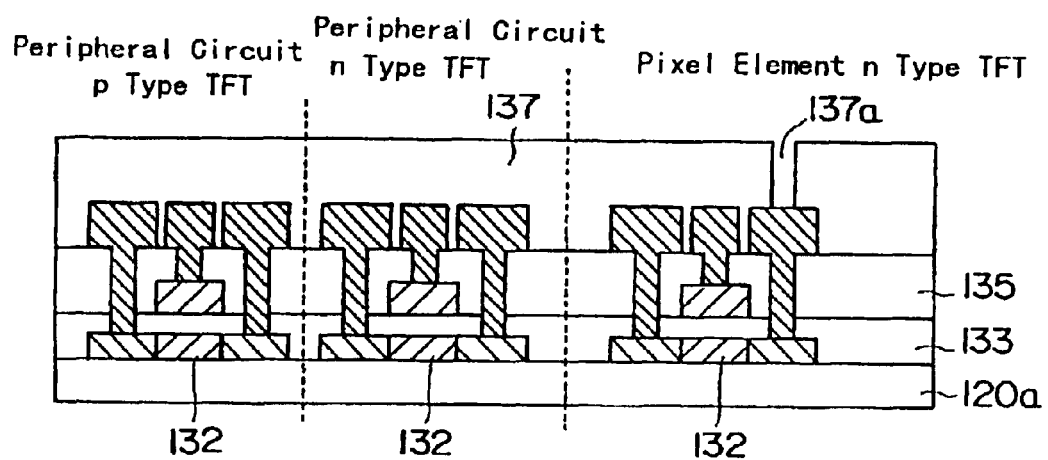
FIGS. 22J and 22K is a sectional view (4) showing the manufacturing method of a liquid crystal panel according to the fourth embodiment.

Subsequently, in step S78, a substrate cleaning process is performed for cleaning the sub-TFT substrate 120a. Then, in step S79, as shown in FIG. 22J, an interlayer insulating film 137 made of $SiN_x$ is formed on a full surface above the sub-TFT substrate 120a by a plasma CVD method.

Then, in step S80, a mask (not shown) having a specified contact hole pattern is formed on the interlayer insulating film 137 by using a photoresist. Then, in step S81, the interlayer insulating film 137 is etched to form a contact hole 137a. Then, in step S82, the resist film is removed.

Subsequently, in step S83, a substrate cleaning process is performed for the sub-TFT substrate 120a. Then, in step S84, ITO film serving as a pixel electrode is formed above the sub-TFT substrate 120a by using a sputtering equipment. Then, in step S85, a resist film having a specified pixel electrode pattern is formed on the ITO film by using a photoresist.

Figure 22K:
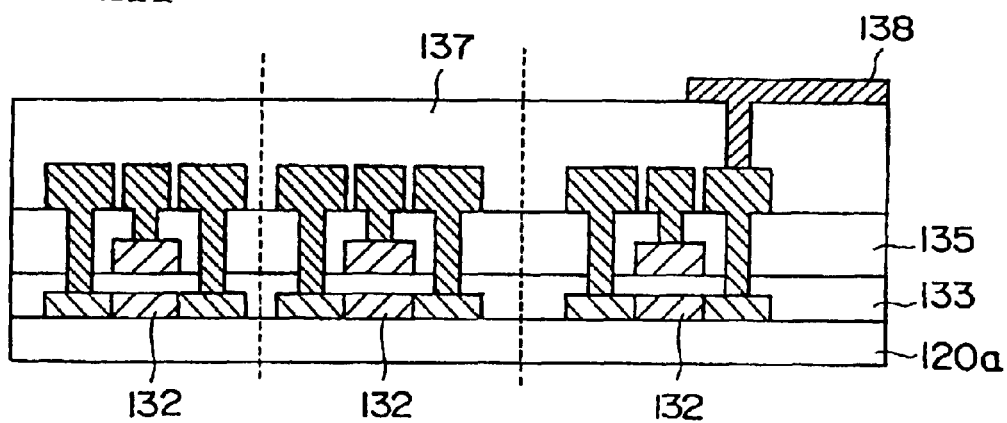

Then, in step S86, the ITO film is etched by using the resist film as a mask to form a pixel electrode 138, as shown in FIG. 22K. Then, in step S87, the resist is removed.

Subsequently, as in the case of the first embodiment, an orientation film is formed on the pixel electrode 138, and rubbing treatment is performed for a surface of the orientation film. A spacer is dispersed on the orientation film, and the substrate is stuck to a CF substrate formed in the same way as that by the conventional method. Then, secondary cutting is performed to separate liquid crystal panels from one another. Then, a liquid crystal is sealed between the TFT substrate and the CF substrate.

The process performed in the fourth embodiment also uses the first manufacturing line 16 (see FIG. 6) to form TFT in the state of the master glass substrate 120. Then, in primary cutting, the master glass substrate 120 is cut into a plurality of sub-TFT substrates. The process in the state of these sub-TFT substrates is performed by using the second manufacturing line 17 until the step of sticking with the CF substrate. Then, secondary cutting is performed for separation into liquid crystal panels. Effects provided by the fourth embodiment are the same as those by the first embodiment.

Fifth Embodiment

Figure 23:
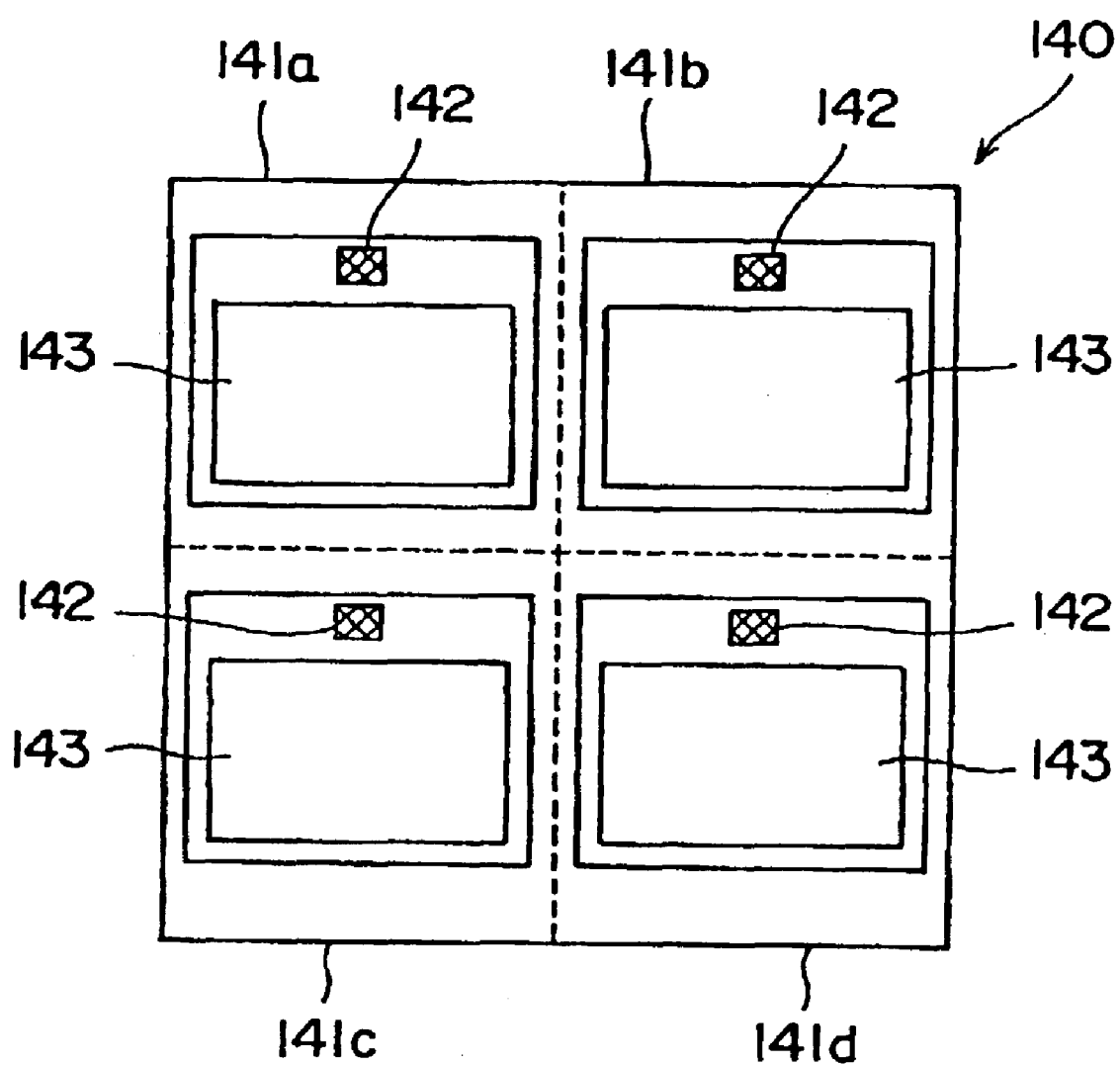
FIG. 23 is a plan view showing a method for manufacturing a liquid crystal panel according to a fifth embodiment of the present invention.

FIG. 23 is a view showing a method for manufacturing a liquid crystal panel according to a fifth embodiment of the present invention.

In the fifth embodiment, a master glass substrate 140 is plotted into four blocks 141a to 141d. In each of these blocks 141a to 141d, one liquid crystal panel 143 having an image sensor (digital camera) 142 of a two-dimensional non-adhesion type is formed.

Figure 24:
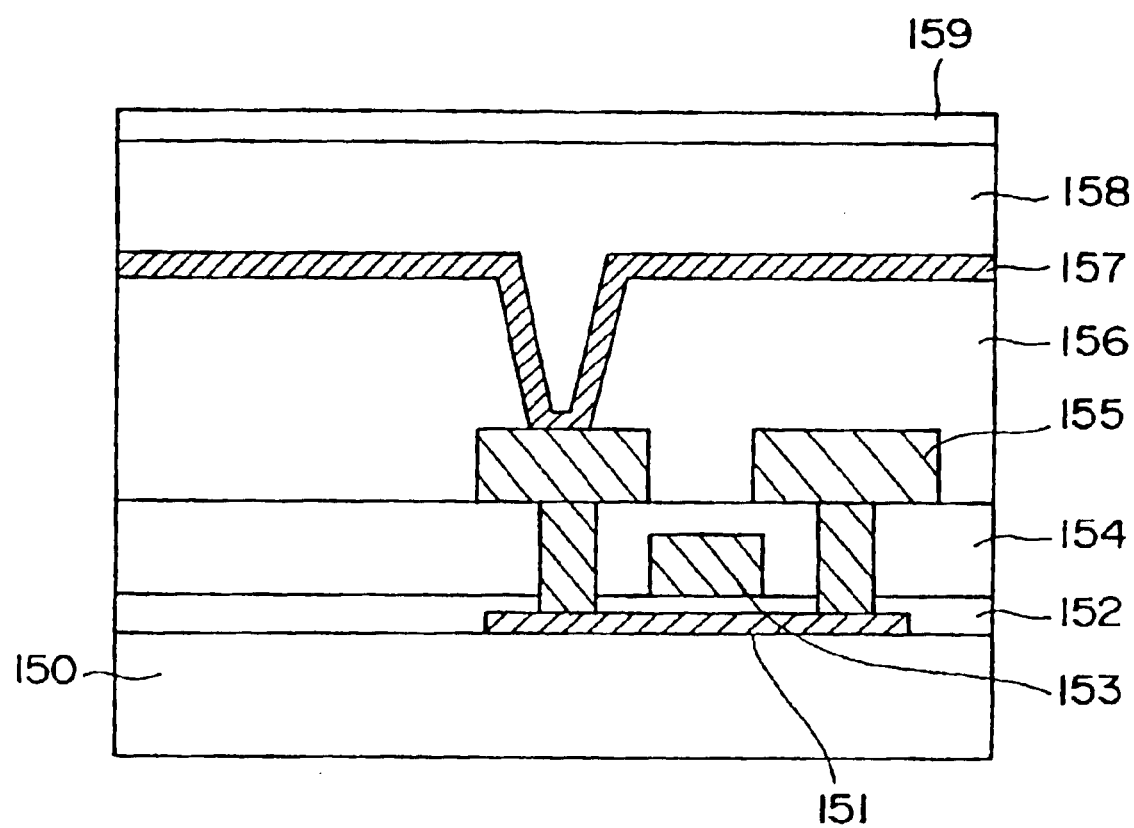
FIG. 24 is a sectional view showing a two-dimensional image sensor incorporated in a liquid crystal panel according to the fifth embodiment.

FIG. 24 is a sectional view showing the two-dimensional image sensor 142 incorporated in the liquid crystal panel 143. In an image sensor forming region, a silicon film 151, a gate insulating film 152 and a gate electrode 153 are formed on a glass substrate 150, and these elements constitute TFT. On the gate insulating film 152, an interlayer insulating film 154 made of $SiO_2$ and $SiN_x$ is formed. A source/drain electrode 155 is formed thereon. The source/drain electrodes 155 is connected to a source/drain region of the silicon film 151 through a contact hole provided in the interlayer insulating film 154. An interlayer insulating film 156 made of $SiN_x$ is formed on the interlayer insulating film 154, and the source/drain electrode 155 is covered with the interlayer insulating film 156. A sensor cell electrode 157 is formed on the interlayer insulating film 156, and a photoelectric conversion layer 158 made of amorphous silicon is formed thereon. A common transparent electrode 159 made of ITO is formed on the photoelectric conversion layer 158.

As can be understood from FIG. 24, the process for the image sensor 142 is basically the same as that for forming a liquid crystal panel until formation of TFT. Thus, in the embodiment, as in the case of the first embodiment, a conductive film, an insulating film and a semiconductor film are formed to constitute TFT of the display region and the image sensor in the sate of the master glass substrate. Primary cutting is performed to cut the master glass substrate into four sub-TFT substrates. Then, the interlayer substrate 156 made of $SiO_2$ is formed on the sub-TFT substrate to have a thickness of 0.5 to 1.0 μm. The interlayer insulating film 156 may be formed by coating a resin such as polyimide to have a thickness of 1.5 to 2.0 μm.

Then, after a contact hole is selectively formed on the interlayer insulating film 156, the sensor cell electrode made of Ti or the like is formed to have a thickness of 0.1 to 0.2 μm. Then, by a plasma CVD (Plasma Enhanced Chemical Vapor Deposition method), the photoelectric conversion layer 158 made of amorphous silicon is formed to have a thickness of 0.5 to 2.0 μm. The common transparent electrode 159 made of ITO is then formed thereon to have a thickness of 0.05 to 0.1 μm. Then, as in the case of the first embodiment, the sub-TFT substrate (TFT substrate) and a CF substrate are stuck to each other, and secondary cutting is performed to cut the sub-TFT substrate to have a specified panel size. Then, a liquid crystal is sealed between the TFT substrate and the CF substrate.

Accordingly, the liquid crystal panel having the image sensor of a two-dimensional non-adhesion type can be efficiently formed.

If the number of steps performed in the sub-TFT substrate processing process is small and high accuracy is not needed for a photolithographic step, formation of the cell electrode 157 and the photoelectric conversion layer 158 in the state of the sub-TFT substrate will be more advantageous than formation of these elements in the state of the master glass substrate, for reducing investments and manufacturing costs.

For example, the photoelectric conversion layer 158 of the image sensor 142 is formed of amorphous silicon having a thickness of 0.2 to 2.0 µm. If an amorphous silicon film is formed to be relatively thick like that described above, efficiency of formation thereof by a single wafer PECVD film-forming equipment will be extremely low. Thus, in the embodiment, the amorphous silicon film is formed by using a batch PECVD device after the primary cutting process. Thus, manufacturing efficiency can be increased by using the batch PECVD device to form the amorphous silicon film simultaneously on the plurality of sub-TFT substrates. If the batch PECVD device is used in the state of the master glass substrate, a large PECVD device will be necessary, and plant and equipment investments will be extremely large. Accordingly, for forming a thick silicon film, the film should preferably be formed after the primary cutting as in the case of the embodiment.

Figure 25:
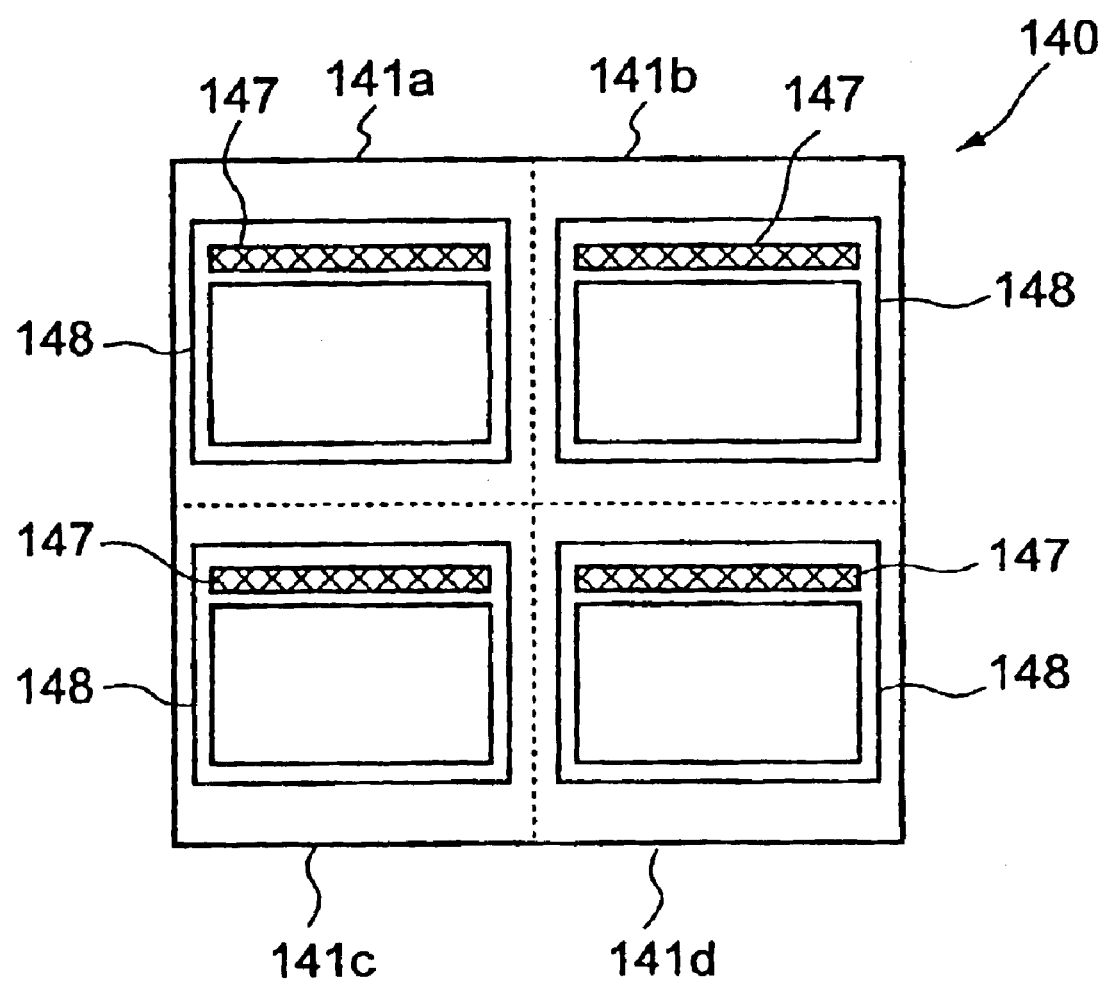
FIG. 25 is a plan view showing an example of applying the method of the fifth embodiment to manufacturing of a liquid crystal panel incorporating a one-dimensional adhesion type image sensor.

FIG. 25 is a plan view showing an example of applying the fifth embodiment to manufacturing of a liquid crystal panel incorporating an image sensor (scanner) of a one-dimensional adhesive type. Also, in this case, as shown in FIG. 25, a master glass substrate 140 is plotted into four blocks 141a to 141d. In each of these blocks 141a to 141d, a region is secured for forming a liquid crystal panel 148 with a built-in image sensor 147 of a one-dimensional adhesive type.

Then, an arraying step is performed by using the first manufacturing line to form a conductive film, an insulating film and a semiconductor film which constitute TFT on the master glass substrate 140. Then, primary cutting is performed for the master glass substrate 140 to be divided into four sub-TFT substrates. By using the second manufacturing line, an image sensor of a one-dimensional adhesive type, a pixel electrode, an orientation film, and so on, are formed on each sub-TFT substrate. Then, the substrate is joined with a CF substrate. Subsequently, secondary cutting is performed for the sub-TFT substrate to form a liquid crystal panel having a specified size, and a liquid crystal is sealed between the TFT substrate (sub-TFT substrate) and the CF substrate. In this way, the liquid crystal panel with the built-in image sensor of a one-dimensional adhesive type can be manufactured.

In the case of a liquid crystal panel with a built-in solar battery, a liquid crystal panel with a built-in one-dimensional or two-dimensional tightly fixed image sensor, a liquid crystal panel with a built-in one-dimensional or two-dimensional no-adhesion image sensor, an intelligent panel with a built-in optical communication light sensor or the like, a photoelectric conversion layer is formed on an upper layer portion. Such a liquid crystal panel with a built-in sensor can be efficiently formed by forming a photoelectric conversion layer in a sub-TFT substrate processing process after primary cutting as in the case of the embodiment. The embodiment can be applied to manufacturing of PC with a built-in two-dimensional image sensor (digital camera) of a non-adhesion type, a portable information equipment having a copying function, which incorporates a line sensor (scanner) of a adhesive type, or the like.

What is claimed is:

1. A manufacturing system of a liquid crystal panel comprising:

a first manufacturing line including master plotting equipment for plotting a master glass substrate into a plurality of blocks, block plotting equipment for plotting each block into one or more device-forming regions, thin film transistor (TFT) equipment for forming a TFT in at least one of the device-forming regions, film-forming equipment for forming a semiconductor film serving as an active layer of the TFT, and cutting equipment for performing a primary cutting process in which the master glass substrate is cut in line with each of the blocks to be made into a sub-TFT substrate; and a second manufacturing line including manufacturing equipment for executing processing of the sub-TFT substrate after the primary cutting process in accordance with a device to be manufactured, and pixel electrode film-forming equipment for forming a pixel electrode above the sub-TFT substrate.

* * * * *